(12) United States Patent
Lord et al.

(10) Patent No.: US 9,245,254 B2
(45) Date of Patent: Jan. 26, 2016

(54) ENHANCED VOICE CONFERENCING WITH HISTORY, LANGUAGE TRANSLATION AND IDENTIFICATION

(75) Inventors: Richard T. Lord, Tacoma, WA (US); Robert W. Lord, Seattle, WA (US); Nathan P. Myhrvold, Medina, WA (US); Clarence T. Tegreene, Bellevue, WA (US); Roderick A. Hyde, Redmond, WA (US); Lowell L. Wood, Jr., Bellevue, WA (US); Muriel Y. Ishikawa, Livermore, CA (US); Victoria Y. H. Wood, Livermore, CA (US); Charles Whitmer, North Bend, WA (US); Paramvir Bahl, Bellevue, WA (US); Douglas C. Burger, Bellevue, WA (US); Ranveer Chandra, Kirkland, WA (US); William H. Gates, III, Medina, WA (US); Paul Holman, Seattle, WA (US); Jordin T. Kare, Seattle, WA (US); Craig J. Mundie, Seattle, WA (US); Tim Paek, Sammamish, WA (US); Desney S. Tan, Kirkland, WA (US); Lin Zhong, Houston, TX (US); Matthew G. Dyor, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 50 days.

(21) Appl. No.: 13/397,289

(22) Filed: Feb. 15, 2012

(65) Prior Publication Data
US 2013/0144603 A1 Jun. 6, 2013

Related U.S. Application Data

(63) Continuation-in-part of application No. 13/309,248, filed on Dec. 1, 2011, now Pat. No. 8,811,638, and a (Continued)

(51) Int. Cl.
*G10L 15/00* (2013.01)
*G06F 3/00* (2006.01)
(Continued)

(52) U.S. Cl.
CPC ............... *G06Q 10/10* (2013.01); *G06F 3/165* (2013.01); *G06F 17/2765* (2013.01);
(Continued)

(58) Field of Classification Search
CPC ............ G06F 17/2785; H04N 5/44543; G10L 15/265
USPC ........................................ 704/9, 235; 715/716
See application file for complete search history.

(56) References Cited

U.S. PATENT DOCUMENTS

| 5,239,586 A | 8/1993 | Marui |
| 5,515,026 A | 5/1996 | Ewert |

(Continued)

OTHER PUBLICATIONS

Menon, Arvind et al; "Roadside Range Sensors for Intersection Decision Support"; bearing a date of Apr. 1, 2004; IEEE; pp. 1-6.

*Primary Examiner* — Farzad Kazeminezhad
(74) *Attorney, Agent, or Firm* — Benedict R. Dugan; Ellen M. Bierman; Lowe Graham Jones PLLC

(57) ABSTRACT

Techniques for ability enhancement are described. Some embodiments provide an ability enhancement facilitator system ("AEFS") configured to enhance voice conferencing among multiple speakers. Some embodiments of the AEFS enhance voice conferencing by recording, translating and presenting voice conference history information based on speaker-related information, wherein the translation is based on language identification using multiple speech recognizers and GPS information. The AEFS receives data that represents utterances of multiple speakers who are engaging in a voice conference with one another. The AEFS then determines speaker-related information, such as by identifying a current speaker, locating an information item (e.g., an email message, document) associated with the speaker, or the like. The AEFS records conference history information (e.g., a transcript) based on the determined speaker-related information. The AEFS then informs a user of the conference history information, such as by presenting a transcript of the voice conference and/or related information items on a display of a conferencing device associated with the user.

43 Claims, 34 Drawing Sheets

Related U.S. Application Data continuation-in-part of application No. 13/324,232, filed on Dec. 13, 2011, now Pat. No. 8,934,652, and a continuation-in-part of application No. 13/340,143, filed on Dec. 29, 2011, now Pat. No. 9,053,096, and a continuation-in-part of application No. 13/356,419, filed on Jan. 23, 2012, and a continuation-in-part of application No. 13/362,823, filed on Jan. 31, 2012, now Pat. No. 9,107,012.

(51) Int. Cl.

| | | |
|---|---|---|
| *G06Q 10/10* | (2012.01) | |
| *H04N 5/445* | (2011.01) | |
| *H04M 3/56* | (2006.01) | |
| *G06F 17/27* | (2006.01) | |
| *G06F 17/28* | (2006.01) | |
| *G10L 17/00* | (2013.01) | |
| *H04L 12/18* | (2006.01) | |
| *G06F 3/16* | (2006.01) | |
| *G10L 15/26* | (2006.01) | |
| *G10L 13/02* | (2013.01) | |
| *H04M 3/42* | (2006.01) | |

(52) U.S. Cl.
CPC ............ *G06F 17/289* (2013.01); *G10L 17/00* (2013.01); *H04L 12/1831* (2013.01); *H04M 3/56* (2013.01); *H04N 5/44543* (2013.01); *G10L 13/02* (2013.01); *G10L 15/26* (2013.01); *G10L 15/265* (2013.01); *H04M 3/42221* (2013.01); *H04M 2201/405* (2013.01); *H04M 2201/41* (2013.01)

(56) References Cited

U.S. PATENT DOCUMENTS

| | | | |
|---|---|---|---|
| 5,983,161 A | | 11/1999 | Lemelson et al. |
| 5,995,898 A | | 11/1999 | Tuttle |
| 6,157,727 A | | 12/2000 | Rueda |
| 6,226,389 B1 | | 5/2001 | Lemelson et al. |
| 6,304,648 B1 | | 10/2001 | Chang |
| 6,326,903 B1 | | 12/2001 | Gross et al. |
| 6,529,866 B1 | | 3/2003 | Cope et al. |
| 6,628,767 B1 | | 9/2003 | Wellner et al. |
| 6,731,202 B1 | | 5/2004 | Klaus |
| 6,944,474 B2 | | 9/2005 | Rader et al. |
| 7,224,981 B2 | | 5/2007 | Deisher et al. |
| 7,324,015 B1 | | 1/2008 | Allen et al. |
| 7,606,444 B1 | * | 10/2009 | Erol et al. ................... 382/305 |
| 7,783,022 B1 | | 8/2010 | Jay et al. |
| 8,050,917 B2 | | 11/2011 | Caspi et al. |
| 8,352,245 B1 | | 1/2013 | Lloyd |
| 8,369,184 B2 | | 2/2013 | Calhoun |
| 8,618,952 B2 | | 12/2013 | Mochizuki |
| 8,669,854 B2 | | 3/2014 | D'Ambrosio et al. |
| 2002/0021799 A1 | | 2/2002 | Kaufholz |
| 2003/0009277 A1 | | 1/2003 | Fan et al. |
| 2003/0139881 A1 | | 7/2003 | Miller et al. |
| 2003/0158900 A1 | | 8/2003 | Santos |
| 2004/0064322 A1 | | 4/2004 | Georgiopoulos et al. |
| 2004/0100868 A1 | | 5/2004 | Patterson, Jr. et al. |
| 2004/0122678 A1 | | 6/2004 | Rousseau |
| 2004/0172252 A1 | * | 9/2004 | Aoki et al. ................... 704/270 |
| 2004/0230651 A1 | | 11/2004 | Ivashin |
| 2004/0263610 A1 | | 12/2004 | Whynot et al. |
| 2005/0010407 A1 | * | 1/2005 | Jaroker .................. G10L 15/26 704/235 |
| 2005/0018828 A1 | | 1/2005 | Nierhaus et al. |
| 2005/0038648 A1 | * | 2/2005 | Ju et al. ..................... 704/231 |
| 2005/0041529 A1 | | 2/2005 | Schliep et al. |
| 2005/0088981 A1 | | 4/2005 | Woodruff et al. |
| 2005/0135583 A1 | | 6/2005 | Kardos |
| 2005/0207554 A1 | | 9/2005 | Ortel |
| 2005/0222769 A1 | | 10/2005 | Simon |
| 2006/0080004 A1 | | 4/2006 | Cheok et al. |
| 2006/0195850 A1 | | 8/2006 | Knight et al. |
| 2007/0118498 A1 | | 5/2007 | Song et al. |
| 2008/0061958 A1 | | 3/2008 | Birk et al. |
| 2008/0117838 A1 | | 5/2008 | Yee et al. |
| 2008/0195387 A1 | * | 8/2008 | Zigel et al. ................... 704/236 |
| 2008/0270132 A1 | | 10/2008 | Navratil et al. |
| 2008/0300777 A1 | | 12/2008 | Fehr et al. |
| 2009/0040037 A1 | | 2/2009 | Schraga |
| 2009/0070102 A1 | | 3/2009 | Maegawa |
| 2009/0119324 A1 | | 5/2009 | Simard et al. |
| 2009/0198735 A1 | | 8/2009 | Yu et al. |
| 2009/0204620 A1 | * | 8/2009 | Thione et al. ................... 707/10 |
| 2009/0271176 A1 | | 10/2009 | Bodin et al. |
| 2009/0281789 A1 | | 11/2009 | Waibel et al. |
| 2009/0282103 A1 | | 11/2009 | Thakkar et al. |
| 2009/0306957 A1 | | 12/2009 | Gao et al. |
| 2009/0307616 A1 | | 12/2009 | Nielsen |
| 2010/0040217 A1 | | 2/2010 | Aberg et al. |
| 2010/0135478 A1 | | 6/2010 | Wald et al. |
| 2010/0153497 A1 | | 6/2010 | Sylvain et al. |
| 2010/0185434 A1 | | 7/2010 | Burvall et al. |
| 2010/0222098 A1 | | 9/2010 | Garg |
| 2010/0315218 A1 | | 12/2010 | Cades et al. |
| 2011/0010041 A1 | | 1/2011 | Wagner et al. |
| 2011/0153324 A1 | | 6/2011 | Ballinger et al. |
| 2011/0184721 A1 | * | 7/2011 | Subramanian et al. ........... 704/4 |
| 2011/0196580 A1 | | 8/2011 | Xu et al. |
| 2011/0216928 A1 | | 9/2011 | Eisenberg et al. |
| 2011/0237295 A1 | | 9/2011 | Bartkowiak et al. |
| 2011/0270922 A1 | | 11/2011 | Jones et al. |
| 2011/0307241 A1 | | 12/2011 | Waibel et al. |
| 2012/0010886 A1 | | 1/2012 | Razavilar |
| 2012/0025965 A1 | | 2/2012 | Mochizuki et al. |
| 2012/0046833 A1 | | 2/2012 | Sanma et al. |
| 2012/0069131 A1 | * | 3/2012 | Abelow .............. G06Q 10/067 348/14.01 |
| 2012/0072109 A1 | | 3/2012 | Waite et al. |
| 2012/0075407 A1 | | 3/2012 | Wessling |
| 2012/0197629 A1 | | 8/2012 | Nakamura et al. |
| 2012/0323575 A1 | | 12/2012 | Gibbon et al. |
| 2013/0021950 A1 | | 1/2013 | Chen et al. |
| 2013/0022189 A1 | | 1/2013 | Ganong, III et al. |
| 2013/0057691 A1 | | 3/2013 | Atsmon et al. |
| 2013/0058471 A1 | | 3/2013 | Garcia |
| 2013/0063542 A1 | | 3/2013 | Bhat et al. |
| 2013/0103399 A1 | * | 4/2013 | Gammon ................... 704/235 |
| 2013/0204616 A1 | | 8/2013 | Aoki et al. |
| 2014/0055242 A1 | | 2/2014 | Mendonca et al. |

\* cited by examiner

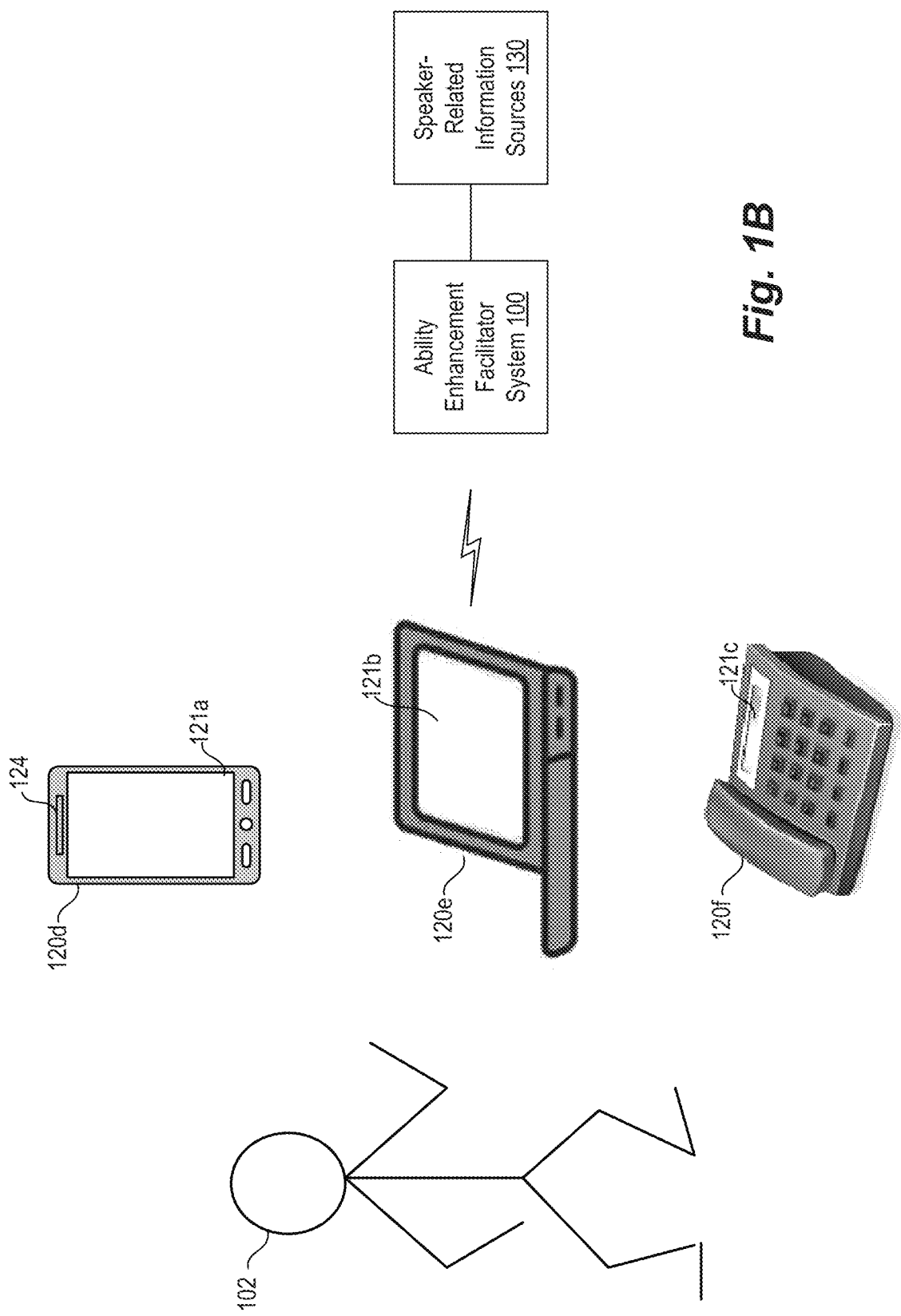

*Fig. 3.1*
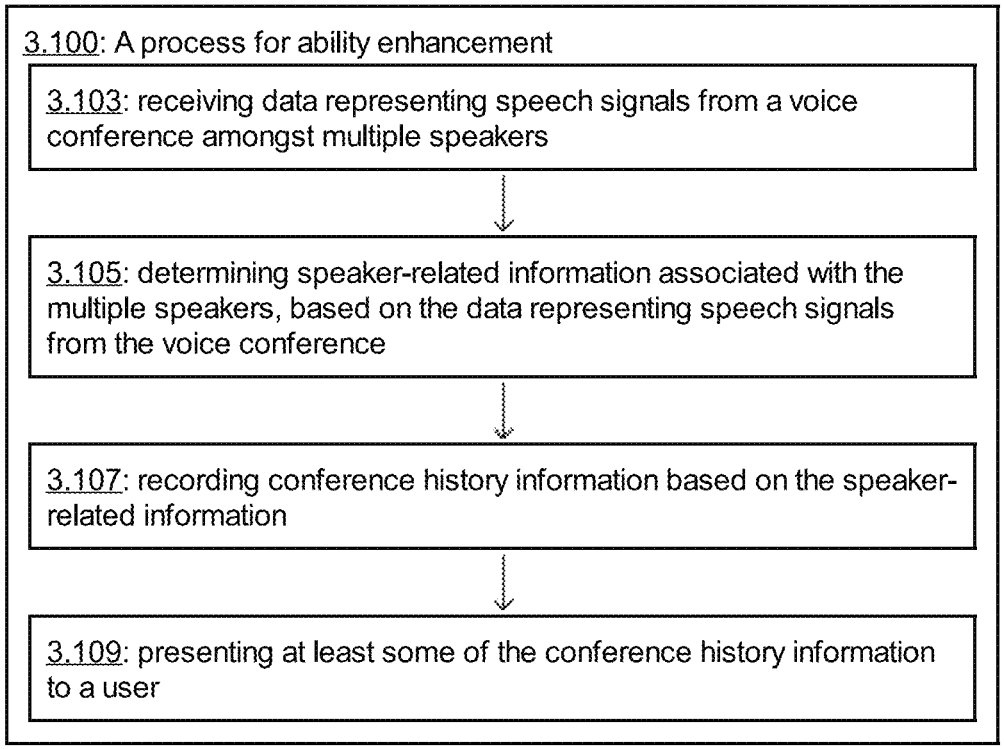
*Fig. 3.2*
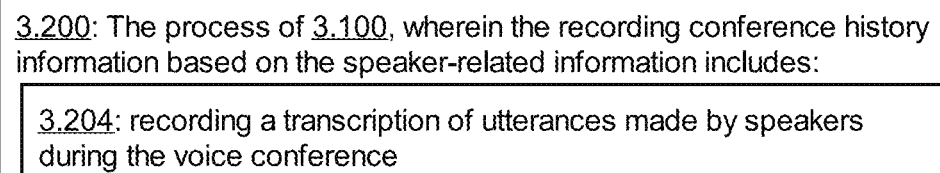

Fig. 3.3

3.300: The process of 3.200, wherein the recording a transcription includes:

> 3.304: performing speech recognition to convert data representing a speech signal from one of the multiple speakers into text

> 3.305: storing the text in association with an indicator of the one speaker

Fig. 3.4

3.400: The process of 3.100, wherein the recording conference history information based on the speaker-related information includes:

> 3.404: recording indications of topics discussed during the voice conference

Fig. 3.5

3.500: The process of 3.400, wherein the recording indications of topics discussed during the voice conference includes:

> 3.504: performing speech recognition to convert the data representing speech signals into text

> 3.505: analyzing the text to identify frequently used terms or phrases

> 3.506: determining the topics discussed during the voice conference based on the frequently used terms or phrases

Fig. 3.6

3.600: The process of 3.100, wherein the recording conference history information based on the speaker-related information includes:

> 3.604: recording indications of information items related to subject matter of the voice conference

Fig. 3.7

3.700: The process of 3.600, wherein the recording indications of information items related to subject matter of the voice conference includes:

> 3.704: performing speech recognition to convert the data representing speech signals into text
>
> 
>
> 3.705: analyzing the text to identify information items mentioned by the speakers

Fig. 3.8

3.800: The process of 3.100, wherein the recording conference history information based on the speaker-related information includes:

> 3.804: recording the data representing speech signals from the voice conference

*Fig. 3.9*

3.900: The process of 3.100, wherein the recording conference history information based on the speaker-related information includes:

> 3.904: as each of the multiple speakers takes a turn speaking during the voice conference, recording speaker-related information associated with the speaker

*Fig. 3.10*

3.1000: The process of 3.100, wherein the recording conference history information based on the speaker-related information includes:

> 3.1004: recording conference history information based on the speaker-related information during a telephone conference call amongst the multiple speakers

*Fig. 3.11*

3.1100: The process of 3.100, wherein the presenting at least some of the conference history information includes:

> 3.1104: presenting the conference history information to a new participant in the voice conference, the new participant having joined the voice conference while the voice conference was already in progress

Fig. 3.12

3.1200: The process of 3.100, wherein the presenting at least some of the conference history information includes:

> 3.1204: presenting the conference history information to a participant in the voice conference, the participant having rejoined the voice conference after having not participated in the voice conference for a period of time

Fig. 3.13

3.1300: The process of 3.1200, wherein the participant rejoins the voice conference after at least one of: pausing the voice conference, muting the voice conference, holding the voice conference, voluntarily leaving the voice conference, and/or involuntarily leaving the voice conference

Fig. 3.14

3.1400: The process of 3.100, wherein the presenting at least some of the conference history information includes:

> 3.1404: presenting the conference history information to a user after conclusion of the voice conference

Fig. 3.15

3.1500: The process of 3.100, wherein the presenting at least some of the conference history information includes:

> 3.1504: providing a user interface configured to access the conference history information by scrolling through a temporal record of the voice conference

*Fig. 3.16*

3.1600: The process of 3.100, wherein the presenting at least some of the conference history information includes:

> 3.1604: presenting a transcription of utterances made by speakers during the voice conference

*Fig. 3.17*

3.1700: The process of 3.100, wherein the presenting at least some of the conference history information includes:

> 3.1704: presenting indications of topics discussed during the voice conference

*Fig. 3.18*

3.1800: The process of 3.100, wherein the presenting at least some of the conference history information includes:

> 3.1804: presenting indications of information items related to subject matter of the voice conference

Fig. 3.19

3.1900: The process of 3.100, wherein the presenting at least some of the conference history information includes:

> 3.1904: presenting, while a current speaker is speaking, conference history information on a display device of the user, the displayed conference history information providing information related to previous statements made by the current speaker

Fig. 3.20

3.2000: The process of 3.100, further comprising:

> 3.2004: performing voice identification based on the data representing the speech signals from the voice conference

Fig. 3.21

3.2100: The process of 3.2000, wherein the performing voice identification includes:

> 3.2104: in a conference call system, matching a portion of the data representing the speech signals with an identity of one of the multiple speakers, based on a communication channel that is associated with the one speaker and over which the portion of the data is transmitted

Fig. 3.22

3.2200: The process of 3.2000, wherein the performing voice identification includes:

> 3.2204: comparing properties of the speech signal with properties of previously recorded speech signals from multiple persons

Fig. 3.23

3.2300: The process of 3.2200, further comprising:

> 3.2304: processing voice messages from the multiple persons to generate voice print data for each of the multiple persons

Fig. 3.24

3.2400: The process of 3.2300, wherein the processing voice messages includes:

> 3.2404: processing telephone voice messages stored by a voice mail service

Fig. 3.25

3.2500: The process of 3.100, further comprising:

> 3.2504: performing speech recognition to convert the data representing speech signals into text data

Fig. 3.26

3.2600: The process of 3.2500, wherein the determining speaker-related information associated with the multiple speakers includes:

> 3.2604: finding an information item that references the one speaker and/or that includes one or more words in the text data

Fig. 3.27

3.2700: The process of 3.2500, further comprising:

3.2704: retrieving information items that reference the text data

3.2706: informing the user of the retrieved information items

Fig. 3.28

3.2800: The process of 3.2500, wherein the performing speech recognition includes:

3.2804: performing speech recognition based at least in part on a language model associated with the one speaker

Fig. 3.29

3.2900: The process of 3.2800, wherein the performing speech recognition based at least in part on a language model associated with the one speaker includes:

3.2904: generating the language model based on information items generated by the one speaker, the information items including at least one of emails transmitted by the one speaker, documents authored by the one speaker, and/or social network messages transmitted by the one speaker

Fig. 3.30

3.3000: The process of 3.2800, wherein the performing speech recognition based at least in part on a language model associated with the one speaker includes:

> 3.3004: generating the language model based on information items generated by or referencing any of the multiple speakers, the information items including emails, documents, and/or social network messages

Fig. 3.31

3.3100: The process of 3.100, wherein the determining speaker-related information associated with the multiple speakers includes:

> 3.3104: determining which one of the multiple speakers is speaking during a time interval

Fig. 3.32

3.3200: The process of 3.3100, wherein the determining which one of the multiple speakers is speaking during a time interval includes:

> 3.3204: associating a first portion of the received data with a first one of the multiple speakers

Fig. 3.33

3.3300: The process of 3.3200, wherein the associating a first portion of the received data with a first one of the multiple speakers includes:

> 3.3304: receiving the first portion of the received data along with an identifier associated with the first speaker

Fig. 3.34

3.3400: The process of 3.3200, wherein the associating a first portion of the received data with a first one of the multiple speakers includes:

> 3.3404: selecting the first portion based on the first portion representing only speech from the one speaker and no other of the multiple speakers

Fig. 3.35

3.3500: The process of 3.3100, further comprising:

> 3.3504: determining that two or more of the multiple speakers are speaking concurrently

Fig. 3.36

3.3600: The process of 3.3100, wherein the determining which one of the multiple speakers is speaking during a time interval includes:

> 3.3604: performing voice identification to select which one of multiple previously analyzed voices is a best match for the one speaker who is speaking during the time interval

*Fig. 3.37*

3.3700: The process of 3.3100, wherein the determining which one of the multiple speakers is speaking during a time interval includes:

> 3.3704: performing speech recognition to convert the received data into text data

> 3.3706: identifying one of the multiple speakers based on the text data

*Fig. 3.38*

3.3800: The process of 3.3700, wherein the identifying one of the multiple speakers based on the text data includes:

> 3.3804: finding an information item that references the one speaker and that includes one or more words in the text data

*Fig. 3.39*

3.3900: The process of 3.100, wherein the determining speaker-related information associated with the multiple speakers includes:

> 3.3904: developing a corpus of speaker data by recording speech from multiple persons

> 3.3905: determining the speaker-related information based at least in part on the corpus of speaker data

Fig. 3.40

3.4000: The process of 3.3900, further comprising:

3.4004: generating a speech model associated with each of the multiple persons, based on the recorded speech

Fig. 3.41

3.4100: The process of 3.3900, further comprising:

3.4104: receiving feedback regarding accuracy of the conference history information

3.4105: training a speech processor based at least in part on the received feedback

Fig. 3.42

3.4200: The process of 3.100, wherein the determining speaker-related information associated with the multiple speakers includes:

3.4204: receiving context information related to the user and/or one of the multiple speakers

3.4206: determining speaker-related information associated with the multiple speakers, based on the context information

Fig. 3.43

3.4300: The process of 3.4200, wherein the receiving context information includes:

> 3.4304: receiving an indication of a location of the user or the one speaker

> 3.4306: determining a plurality of persons with whom the user or the one speaker commonly interacts at the location

Fig. 3.44

3.4400: The process of 3.4300, wherein the receiving an indication of a location of the user or the one speaker includes:

> 3.4404: receiving at least one of a GPS location from a mobile device of the user or the one speaker, a network identifier that is associated with the location, an indication that the user or the one speaker is at a workplace, an indication that the user or the one speaker is at a residence, an information item that references the user or the one speaker, an information item that references the location of the user or the one speaker

Fig. 3.45

3.4500: The process of 3.100, wherein the presenting at least some of the conference history information includes:

> 3.4504: presenting the conference history information on a display of a conferencing device of the user

Fig. 3.46

3.4600: The process of 3.100, wherein the presenting at least some of the conference history information includes:

> 3.4604: presenting the conference history information on a display of a computing device that is distinct from a conferencing device of the user

Fig. 3.47

3.4700: The process of 3.100, wherein the presenting at least some of the conference history information includes:

> 3.4704: determining a display to serve as a presentation device for the conference history information

Fig. 3.48

3.4800: The process of 3.4700, wherein the determining a display includes:

> 3.4804: selecting one display from multiple displays, based on at least one of: whether each of the multiple displays is capable of displaying all of the conference history information, the size of each of the multiple displays, and/or whether each of the multiple displays is suitable for displaying the conference history information

Fig. 3.49

3.4900: The process of 3.100, further comprising:

> 3.4904: audibly notifying the user to view the conference history information on a display device

Fig. 3.50

3.5000: The process of 3.100, wherein the presenting at least some of the conference history information includes:

> 3.5004: informing the user of an identifier of each of the multiple speakers

Fig. 3.51

3.5100: The process of 3.100, wherein the presenting at least some of the conference history information includes:

> 3.5104: informing the user of information aside from identifying information related to the multiple speakers

Fig. 3.52

3.5200: The process of 3.100, wherein the presenting at least some of the conference history information includes:

> 3.5204: informing the user of an identifier of a speaker along with a transcription of a previous utterance made by the speaker

Fig. 3.53

3.5300: The process of 3.100, wherein the presenting at least some of the conference history information includes:

> 3.5304: informing the user of an organization to which each of the multiple speakers belongs

Fig. 3.54

3.5400: The process of 3.100, wherein the presenting at least some of the conference history information includes:

> 3.5404: informing the user of a previously transmitted communication referencing one of the multiple speakers

Fig. 3.55

3.5500: The process of 3.5400, wherein the presenting at least some of the conference history information includes:

> 3.5504: informing the user of at least one of: an email transmitted between the one speaker and the user and/or a text message transmitted between the one speaker and the user

Fig. 3.56

3.5600: The process of 3.100, wherein the presenting at least some of the conference history information includes:

> 3.5604: informing the user of an event involving the user and one of the multiple speakers

Fig. 3.57

3.5700: The process of 3.5600, wherein the presenting at least some of the conference history information includes:

> 3.5704: informing the user of a previously occurring event and/or a future event that is at least one of a project, a meeting, and/or a deadline

Fig. 3.58

3.5800: The process of 3.100, wherein the determining speaker-related information associated with the multiple speakers includes:

> 3.5804: accessing information items associated with one of the multiple speakers

Fig. 3.59

3.5900: The process of 3.5800, wherein the accessing information items associated with one of the multiple speakers includes:

> 3.5904: searching for information items that reference the one speaker, the information items including at least one of a document, an email, and/or a text message

Fig. 3.60

3.6000: The process of 3.5800, wherein the accessing information items associated with one of the multiple speakers includes:

> 3.6004: accessing a social networking service to find messages or status updates that reference the one speaker

Fig. 3.61

3.6100: The process of 3.5800, wherein the accessing information items associated with one of the multiple speakers includes:

> 3.6104: accessing a calendar to find information about appointments with the one speaker

Fig. 3.62

3.6200: The process of 3.5800, wherein the accessing information items associated with one of the multiple speakers includes:

> 3.6204: accessing a document store to find documents that reference the one speaker

Fig. 3.63

3.6300: The process of 3.100, wherein the receiving data representing speech signals from a voice conference amongst multiple speakers includes:

> 3.6304: receiving audio data from at least one of a telephone, a conference call, an online audio chat, a video conference, and/or a face-to-face conference that includes the multiple speakers, the received audio data representing utterances made by at least one of the multiple speakers

Fig. 3.64

3.6400: The process of 3.100, wherein the receiving data representing speech signals from a voice conference amongst multiple speakers includes:

> 3.6404: receiving data representing speech signals from a voice conference amongst multiple speakers, wherein the multiple speakers are remotely located from one another

Fig. 3.65

3.6500: The process of 3.100, wherein the presenting at least some of the conference history information includes:

> 3.6504: transmitting the conference history information from a first device to a second device having a display

Fig. 3.66

3.6600: The process of 3.6500, wherein the transmitting the conference history information from a first device to a second device includes:

> 3.6604: wirelessly transmitting the conference history information

Fig. 3.67

3.6700: The process of 3.6500, wherein the transmitting the conference history information from a first device to a second device includes:

> 3.6704: transmitting the conference history information from a smart phone to the second device

Fig. 3.68

3.6800: The process of 3.6500, wherein the transmitting the conference history information from a first device to a second device includes:

> 3.6804: transmitting the conference history information from a server system to the second device

Fig. 3.69

3.6900: The process of 3.6800, wherein the transmitting the conference history information from a server system includes:

> 3.6904: transmitting the conference history information from a server system that resides in a data center

Fig. 3.70

3.7000: The process of 3.6800, wherein the transmitting the conference history information from a server system includes:

> 3.7004: transmitting the conference history information from a server system to a desktop computer, a laptop computer, a mobile device, or a desktop telephone of the user

Fig. 3.71

3.7100: The process of 3.100, further comprising:

3.7104: performing the receiving data representing speech signals from a voice conference amongst multiple speakers, the determining speaker-related information associated with the multiple speakers, the recording conference history information based on the speaker-related information, and/or the presenting at least some of the conference history information on a mobile device that is operated by the user

Fig. 3.72

3.7200: The process of 3.7100, wherein the determining speaker-related information associated with the multiple speakers includes:

3.7204: determining speaker-related information associated with the multiple speakers, performed on a smart phone or a media player that is operated by the user

Fig. 3.73

3.7300: The process of 3.100, further comprising:

3.7304: performing the receiving data representing speech signals from a voice conference amongst multiple speakers, the determining speaker-related information associated with the multiple speakers, the recording conference history information based on the speaker-related information, and/or the presenting at least some of the conference history information on a general purpose computing device that is operated by the user

Fig. 3.74

3.7400: The process of 3.100, further comprising:

3.7404: performing one or more of the receiving data representing speech signals from a voice conference amongst multiple speakers, the determining speaker-related information associated with the multiple speakers, the recording conference history information based on the speaker-related information, and/or the presenting at least some of the conference history information on each of multiple computing systems, wherein each of the multiple systems is associated with one of the multiple speakers

Fig. 3.75

3.7500: The process of 3.100, further comprising:

3.7504: performing one or more of the receiving data representing speech signals from a voice conference amongst multiple speakers, the determining speaker-related information associated with the multiple speakers, the recording conference history information based on the speaker-related information, and/or the presenting at least some of the conference history information within a conference call provider system

Fig. 3.76

3.7600: The process of 3.100, further comprising:

3.7604: determining to perform at least some of the receiving data representing speech signals from a voice conference amongst multiple speakers, the determining speaker-related information associated with the multiple speakers, the recording conference history information based on the speaker-related information, and/or the presenting at least some of the conference history information on another computing device that has available processing capacity

Fig. 3.77

3.7700: The process of 3.7600, further comprising:

3.7704: receiving at least some of speaker-related information or the conference history information from the another computing device

Fig. 3.78

3.7800: The process of 3.100, further comprising:

3.7804: selecting a portion of the conference history information based on capabilities of a device operated by the user

3.7805: transmitting the selected portion for presentation on the device operated by the user

Fig. 3.79

3.7900: The process of 3.100, further comprising:

3.7904: performing speech recognition to convert an utterance of one of the multiple speakers into text, the speech recognition performed at a mobile device of the one speaker

3.7905: transmitting the text along with an audio representation of the utterance and an identifier of the speaker to a remote conferencing device and/or a conference call system

Fig. 3.80

3.8000: The process of 3.100, further comprising:

3.8004: translating an utterance of one of the multiple speakers in a first language into a message in a second language, based on the speaker-related information

3.8006: recording the message in the second language as part of the conference history information

Fig. 3.81

3.8100: The process of 3.8000, further comprising:

3.8104: determining the first language

Fig. 3.82

3.8200: The process of 3.8000, wherein the translating an utterance of one of the multiple speakers in a first language into a message in a second language includes:

3.8204: performing speech recognition, based on the speaker-related information, on the data representing the speech signal to convert the utterance in the first language into text representing the utterance in the first language

3.8206: translating, based on the speaker-related information, the text representing the utterance in the first language into text representing the message in the second language

Fig. 3.83

3.8300: The process of 3.8200, further comprising:

3.8304: performing speech synthesis to convert the text representing the utterance in the second language into audio data representing the message in the second language

3.8305: causing the audio data representing the message in the second language to be played to the user

Fig. 3.84

3.8400: The process of 3.8000, wherein the translating an utterance of one of the multiple speakers in a first language into a message in a second language includes:

3.8404: translating the utterance based on speaker-related information including a language model that is adapted to the one speaker

Fig. 3.85

3.8500: The process of 3.8000, wherein the translating an utterance of one of the multiple speakers in a first language into a message in a second language includes:

3.8504: translating the utterance based on speaker-related information including a language model adapted to the voice conference

Fig. 3.86

3.8600: The process of 3.8500, wherein the translating the utterance based on speaker-related information including a language model adapted to the voice conference includes:

> 3.8604: generating the language model based on information items by or about any of the multiple speakers, the information items including at least one of emails, documents, and/or social network messages

Fig. 3.87

3.8700: The process of 3.8000, wherein the translating an utterance of one of the multiple speakers in a first language into a message in a second language includes:

> 3.8704: translating the utterance based on speaker-related information including a language model developed with respect to a corpus of related content

Fig. 3.88

3.8800: The process of 3.8700, wherein the corpus of related content is obtained from at least one of a voice conference, an academic conference, a media program, an academic journal, and/or a Web site

Fig. 3.89

3.8900: The process of 3.100, wherein the receiving data representing speech signals from a voice conference amongst multiple speakers includes:

> 3.8904: receiving digital samples of an audio wave captured by a microphone

Fig. 3.90

3.9000: The process of 3.100, wherein the receiving data representing speech signals from a voice conference amongst multiple speakers includes:

> 3.9004: receiving a recorded voice samples from a storage device

Fig. 3.91

3.9100: The process of 3.100, wherein the user is one of the multiple speakers

Fig. 3.92

3.9200: The process of 3.100, wherein the user is not one of the multiple speakers

Fig. 3.93

3.9300: The process of 3.100, wherein the speaker is not a human

*Fig. 3.94*

3.9400: The process of 3.100, further comprising:

3.9404: determining to perform one or more of archiving, indexing, searching, removing, redacting, duplicating, or deleting some of the conference history information based on a data retention policy

ENHANCED VOICE CONFERENCING WITH HISTORY, LANGUAGE TRANSLATION AND IDENTIFICATION

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 13/309,248, entitled AUDIBLE ASSISTANCE, filed 1 Dec. 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/324,232, entitled VISUAL PRESENTATION OF SPEAKER-RELATED INFORMATION, filed 13 Dec. 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/340,143, entitled LANGUAGE TRANSLATION BASED ON SPEAKER-RELATED INFORMATION, filed 29 Dec. 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/356,419, entitled ENHANCED VOICE CONFERENCING, filed 23 Jan. 2012, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/362,823, entitled VEHICULAR THREAT DETECTION BASED ON AUDIO SIGNALS, filed 31 Jan. 2012, which is currently co-pending, or is an application of which a currently co-pending application is entitled to the benefit of the filing date.

TECHNICAL FIELD

The present disclosure relates to methods, techniques, and systems for ability enhancement and, more particularly, to methods, techniques, and systems for recording and presenting voice conference history information based on speaker-related information determined from speaker utterances and/or other sources.

BACKGROUND

Human abilities such as hearing, vision, memory, foreign or native language comprehension, and the like may be limited for various reasons. For example, with aging, various abilities such as hearing, vision, memory, may decline or otherwise become compromised. As the population in general ages, such declines may become more common and widespread. In addition, young people are increasingly listening to music through headphones, which may also result in hearing loss at earlier ages.

In addition, limits on human abilities may be exposed by factors other than aging, injury, or overuse. As one example, the world population is faced with an ever increasing amount of information to review, remember, and/or integrate. Managing increasing amounts of information becomes increasingly difficult in the face of limited or declining abilities such as hearing, vision, and memory. As another example, as the world becomes increasingly virtually and physically connected (e.g., due to improved communication and cheaper travel), people are more frequently encountering others who speak different languages. In addition, the communication technologies that support an interconnected, global economy may further expose limited human abilities. For example, it may be difficult for a user to determine who is speaking during a conference call. Even if the user is able to identify the speaker, it may still be difficult for the user to recall or access related information about the speaker and/or topics discussed during the call. Also, it may be difficult for a user to recall all of the events or information discussed during the course of a conference call or other type of conversation.

Current approaches to addressing limits on human abilities may suffer from various drawbacks. For example, there may be a social stigma connected with wearing hearing aids, corrective lenses, or similar devices. In addition, hearing aids typically perform only limited functions, such as amplifying or modulating sounds for a hearer. As another example, current approaches to foreign language translation, such as phrase books or time-intensive language acquisition, are typically inefficient and/or unwieldy. Furthermore, existing communication technologies are not well integrated with one another, making it difficult to access information via a first device that is relevant to a conversation occurring via a second device. Also, manual note taking during the course of a conference call or other conversation may be intrusive, distracting, and/or ineffective. For example, a note-taker may not be able to accurately capture everything that was said and/or meeting notes may not be well integrated with other information sources or items that are related to the subject matter of the conference call.

BRIEF DESCRIPTION OF THE DRAWINGS

FIG. 1B is an example block diagram illustrating various conferencing devices according to example embodiments.

FIGS. 3.1-3.94 are example flow diagrams of ability enhancement processes performed by example embodiments.

DETAILED DESCRIPTION

Figure 1A:
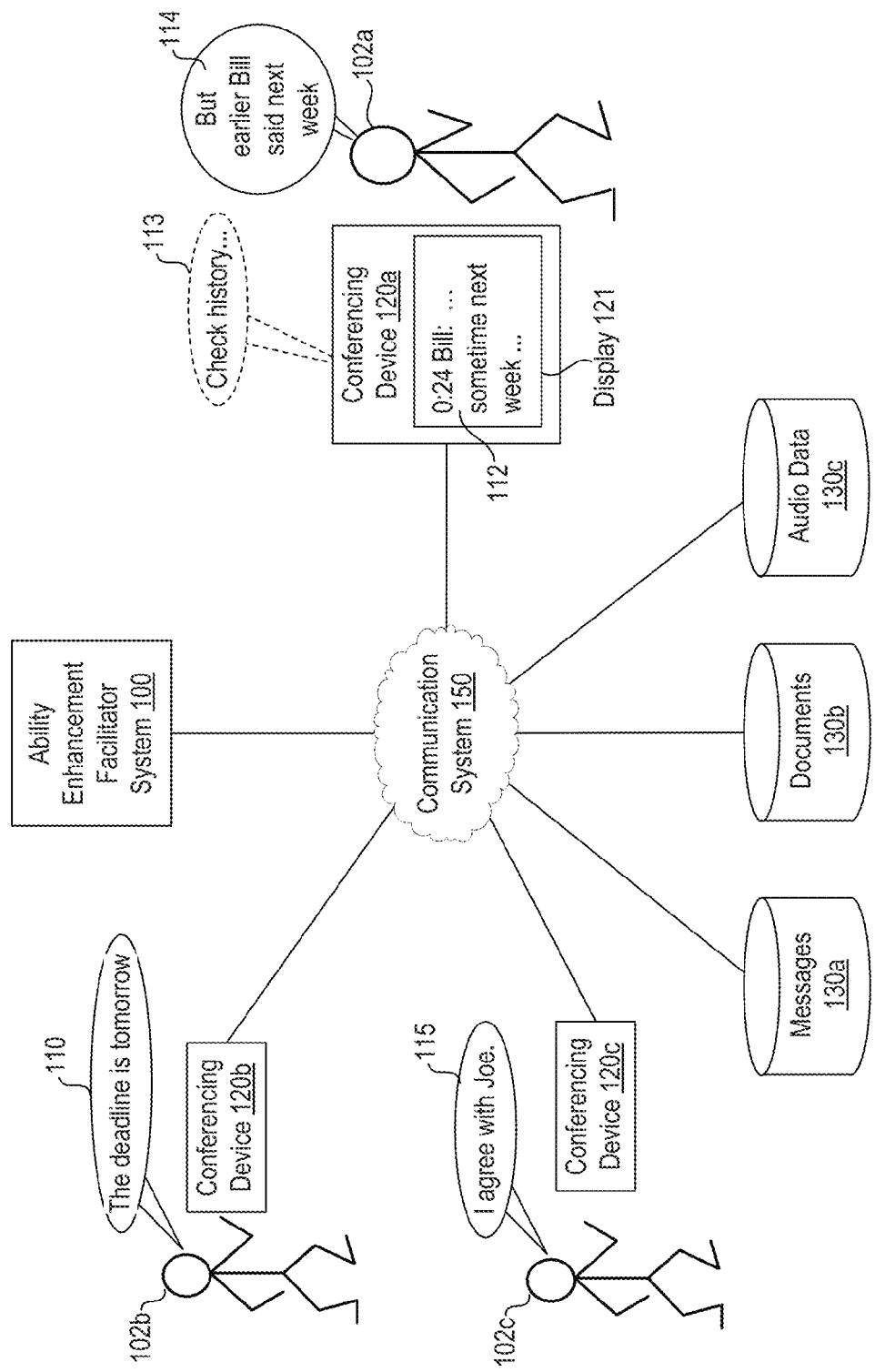
FIG. 1A is an example block diagram of an ability enhancement facilitator system according to an example embodiment.

Embodiments described herein provide enhanced computer- and network-based methods and systems for enhanced voice conferencing and, more particularly, for recording and presenting voice conference history information based on speaker-related information determined from speaker utterances and/or other sources. Example embodiments provide an Ability Enhancement Facilitator System ("AEFS"). The AEFS may augment, enhance, or improve the senses (e.g., hearing), faculties (e.g., memory, language comprehension), and/or other abilities of a user, such as by recording and presenting voice conference history based on speaker-related information related to participants in a voice conference (e.g., conference call, face-to-face meeting). For example, when multiple speakers engage in a voice conference (e.g., a telephone conference), the AEFS may "listen" to the voice conference in order to determine speaker-related information, such as identifying information (e.g., name, title) about the current speaker (or some other speaker) and/or events/communications relating to the current speaker and/or to the subject matter of the conference call generally. Then, the AEFS may record voice conference history information based on the determined speaker-related information. The recorded conference history information may include transcriptions of utterances made by users, indications of topics discussed during the voice conference, information items (e.g., email messages, calendar events, documents) related to the voice conference, or the like. Next, the AEFS may inform a user (typically one of the participants in the voice conference) of the recorded conference history information, such as by presenting the information via a conferencing device (e.g., smart phone, laptop, desktop telephone) associated with the user. The user can then receive the information (e.g., by reading or hearing it via the conferencing device) provided by the AEFS and advantageously use that information to avoid embarrassment (e.g., due to having joined the voice conference late and thus having missed some of its contents), engage in a more productive conversation (e.g., by quickly accessing information about events, deadlines, or communications discussed during the voice conference), or the like.

In some embodiments, the AEFS is configured to receive data that represents speech signals from a voice conference amongst multiple speakers. The multiple speakers may be remotely located from one another, such as by being in different rooms within a building, by being in different buildings within a site or campus, by being in different cities, or the like. Typically, the multiple speakers are each using a conferencing device, such as a land-line telephone, cell phone, smart phone, computer, or the like, to communicate with one another. In some cases, such as when the multiple speakers are together in one room, the speakers may not be using a conferencing device to communicate with one another, but at least one of the speakers may have a conferencing device (e.g., a smart phone or personal media player/device that records conference history information as described.

The AEFS may obtain the data that represents the speech signals from one or more of the conferencing devices and/or from some intermediary point, such as a conference call facility, chat system, videoconferencing system, PBX, or the like. The AEFS may then determine voice conference-related information, including speaker-related information associated with the one or more of the speakers. Determining speaker-related information may include identifying the speaker based at least in part on the received data, such as by performing speaker recognition and/or speech recognition with the received data. Determining speaker-related information may also or instead include determining an identifier (e.g., name or title) of the speaker, content of the speaker's utterance, an information item (e.g., a document, event, communication) that references the speaker, or the like. Next, the AEFS records conference history information based on the determined speaker-related information. In some embodiments, recording conference history information may include generating a timeline, log, history, or other structure that associates speaker-related information with a timestamp or other time indicator. Then, the AEFS may inform a user of the conference history information by, for example, visually presenting the conference history information via a display screen of a conferencing device associated with the user. In other embodiments, some other display may be used, such as a screen on a laptop computer that is being used by the user while the user is engaged in the voice conference via a telephone. In some embodiments, the AEFS may inform the user in an audible manner, such as by "speaking" the conference-history information via an audio speaker of the conferencing device.

In some embodiments, the AEFS may perform other services, including translating utterances made by speakers in a voice conference, so that a multi-lingual voice conference may be facilitated even when some speakers do not understand the language used by other speakers. In such cases, the determined speaker-related information may be used to enhance or augment language translation and/or related processes, including speech recognition, natural language processing, and the like. In addition, the conference history information may be recorded in one or more languages, so that it can be presented in a native language of each of one or more users.

1. Ability Enhancement Facilitator System Overview

FIG. 1A is an example block diagram of an ability enhancement facilitator system according to an example embodiment. In particular, FIG. 1A shows multiple speakers 102a-102c (collectively also referred to as "participants") engaging in a voice conference with one another. In particular, a first speaker 102a (who may also be referred to as a "user" or a "participant") is engaging in a voice conference with speakers 102b and 102c. Abilities of the speaker 102a are being enhanced, via a conferencing device 120a, by an Ability Enhancement Facilitator System ("AEFS") 100. The conferencing device 120a includes a display 121 that is configured to present text and/or graphics. The conferencing device 120a also includes an audio speaker (not shown) that is configured to present audio output. Speakers 102b and 102c are each respectively using a conferencing device 120b and 120c to engage in the voice conference with each other and speaker 102a via a communication system 150.

The AEFS 100 and the conferencing devices 120 are communicatively coupled to one another via the communication system 150. The AEFS 100 is also communicatively coupled to speaker-related information sources 130, including messages 130a, documents 130b, and audio data 130c. The AEFS 100 uses the information in the information sources 130, in conjunction with data received from the conferencing devices 120, to determine information related to the voice conference, including speaker-related information associated with the speakers 102.

In the scenario illustrated in FIG. 1A, the voice conference among the participants 102 is under way. For this example, the participants 102 in the voice conference are attempting to determine the date of a particular deadline for a project. The speaker 102b asserts that the deadline is tomorrow, and has made an utterance 110 by speaking the words "The deadline is tomorrow." However, this assertion is counter to a statement that the speaker 102b made earlier in the voice conference. The speaker 102a may have a notion or belief that the speaker 102b is contradicting himself, but may not be able to support such an assertion without additional evidence or information. Alternatively, the speaker 102a may have joined the voice conference once it was already in progress, and thus have missed the portion of the voice conference when the deadline was initially discussed. As will be discussed further below, the AEFS 100 will inform the speaker 102a of the relevant voice conference history information, such that the speaker 102a can request that the speaker 102b be held to his earlier statement setting the deadline next week rather than tomorrow.

The AEFS 100 receives data representing a speech signal that represents the utterance 110, such as by receiving a digital representation of an audio signal transmitted by conferencing device 120b. The data representing the speech signal may include audio samples (e.g., raw audio data), compressed audio data, speech vectors (e.g., mel frequency cepstral coefficients), and/or any other data that may be used to represent an audio signal. The AEFS 100 may receive the data in various ways, including from one or more of the conferencing devices or from some intermediate system (e.g., a voice conferencing system that is facilitating the conference between the conferencing devices 120).

The AEFS 100 then determines speaker-related information associated with the speaker 102b. Determining speaker-related information may include identifying the speaker 102b based on the received data representing the speech signal. In some embodiments, identifying the speaker may include performing speaker recognition, such as by generating a "voice print" from the received data and comparing the generated voice print to previously obtained voice prints. For example, the generated voice print may be compared to multiple voice prints that are stored as audio data 130c and that each correspond to a speaker, in order to determine a speaker who has a voice that most closely matches the voice of the speaker 102b. The voice prints stored as audio data 130c may be generated based on various sources of data, including data corresponding to speakers previously identified by the AEFS 100, voice mail messages, speaker enrollment data, or the like.

In some embodiments, identifying the speaker 102b may include performing speech recognition, such as by automatically converting the received data representing the speech signal into text. The text of the speaker's utterance may then be used to identify the speaker 102b. In particular, the text may identify one or more entities such as information items (e.g., communications, documents), events (e.g., meetings, deadlines), persons, or the like, that may be used by the AEFS 100 to identify the speaker 102b. The information items may be accessed with reference to the messages 130a and/or documents 130b. As one example, the speaker's utterance 110 may identify an email message that was sent to the speaker 102b and possibly others (e.g., "That sure was a nasty email Bob sent"). As another example, the speaker's utterance 110 may identify a meeting or other event to which the speaker 102b and possibly others are invited.

Note that in some cases, the text of the speaker's utterance 110 may not definitively identify the speaker 102b, such as because the speaker 102b has not previously met or communicated with other participants in the voice conference or because a communication was sent to recipients in addition to the speaker 102b. In such cases, there may be some ambiguity as to the identity of the speaker 102b. However, in such cases, a preliminary identification of multiple candidate speakers may still be used by the AEFS 100 to narrow the set of potential speakers, and may be combined with (or used to improve) other techniques, including speaker recognition, speech recognition, language translation, or the like. In addition, even if the speaker 102 is unknown to the user 102a the AEFS 100 may still determine useful demographic or other speaker-related information that may be fruitfully employed for speech recognition or other purposes.

Note also that speaker-related information need not definitively identify the speaker. In particular, it may also or instead be or include other information about or related to the speaker, such as demographic information including the gender of the speaker 102, his country or region of origin, the language(s) spoken by the speaker 102, or the like. Speaker-related information may include an organization that includes the speaker (along with possibly other persons, such as a company or firm), an information item that references the speaker (and possibly other persons), an event involving the speaker, or the like. The speaker-related information may generally be determined with reference to the messages 130a, documents 130b, and/or audio data 130c. For example, having determined the identity of the speaker 102, the AEFS 100 may search for emails and/or documents that are stored as messages 130a and/or documents 103b and that reference (e.g., are sent to, are authored by, are named in) the speaker 102.

Other types of speaker-related information is contemplated, including social networking information, such as personal or professional relationship graphs represented by a social networking service, messages or status updates sent within a social network, or the like. Social networking information may also be derived from other sources, including email lists, contact lists, communication patterns (e.g., frequent recipients of emails), or the like.

The AEFS 100 then determines and/or records (e.g., stores, saves) conference history information based on the determined speaker-related information. For example, the AEFS 100 may associate a timestamp with speaker-related information, such a transcription of an utterance (e.g., generated by a speech recognition process), an indication of an information item referenced by a speaker (e.g., a message, a document, a calendar event), topics discussed during the voice conference, or the like. The conference history information may be recorded locally to the AEFS 100, on conferencing devices 120, or other locations, such as cloud-based storage systems.

The AEFS 100 then informs the user (speaker 102a) of at least some of the conference history information. Informing the user may include audibly presenting the information to the user via an audio speaker of the conferencing device 120a. In this example, the conferencing device 120a tells the user 102a, such as by playing audio via an earpiece or in another manner that cannot be detected by the other participants in the voice conference, to check the conference history presented by conferencing device 120a. In particular, the conferencing device 120a plays audio that includes the utterance 113 "Check history" to the user. The AEFS 100 may cause the conferencing device 120a to play such a notification because, for example, it has automatically searched the conference history and determined that the topic of the deadline has been previously discussed during the voice conference.

Informing the user of the conference history information may also or instead include visually presenting the information, such as via the display 121 of the conferencing device 120a. In the illustrated example, the AEFS 100 causes a message 112 that includes a portion of a transcript of the voice conference to be displayed on the display 121. In this example, the displayed transcript includes a statement from Bill (speaker 102b) that sets the project deadline to next week, not tomorrow. Upon reading the message 112 and thereby learning of the previously established project deadline, the speaker 102a responds to the original utterance 110 of speaker 102b (Bill) with a response utterance 114 that includes the words "But earlier Bill said next week," referring to the earlier statement of speaker 102b that is counter to the deadline expressed by his current utterance 110. In the illustrated example, speaker 102c, upon hearing the utterance 114, responds with an utterance 115 that includes the words "I agree with Joe," indicating his agreement with speaker 102a.

As the speakers 102a-102c continue to engage in the voice conference, the AEFS 100 may monitor the conversation and continue to record and present conference history information based on speaker-related information at least for the speaker 102a. Another example function that may be performed by the AEFS 100 includes concurrently presenting speaker-related information as it is determined, such as by presenting, as each of the multiple speakers takes a turn speaking during the voice conference, information about the identity of the current speaker. For example, in response to the onset of an utterance of a speaker, the AEFS 100 may display the name of the speaker on the display 121, so that the user is always informed as to who is speaking.

The AEFS 100 may perform other services, including translating utterances made by speakers in the voice conference, so that a multi-lingual voice conference may be conducted even between participants who do not understand all of the languages being spoken. Translating utterances may initially include determining speaker-related information by automatically determining the language that is being used by a current speaker. Determining the language may be based on signal processing techniques that identify signal characteristics unique to particular languages. Determining the language may also or instead be performed by simultaneous or concurrent application of multiple speech recognizers that are each configured to recognize speech in a corresponding language, and then choosing the language corresponding to the recognizer that produces the result having the highest confidence level. Determining the language may also or instead be based on contextual factors, such as GPS information indicating that the current speaker is in Germany, Austria, or some other region where German is commonly spoken.

Having determined speaker-related information, the AEFS 100 may then translate an utterance in a first language into an utterance in a second language. In some embodiments, the AEFS 100 translates an utterance by first performing speech recognition to translate the utterance into a textual representation that includes a sequence of words in the first language. Then, the AEFS 100 may translate the text in the first language into a message in a second language, using machine translation techniques. Speech recognition and/or machine translation may be modified, enhanced, and/or otherwise adapted based on the speaker-related information. For example, a speech recognizer may use speech or language models tailored to the speaker's gender, accent/dialect (e.g., determined based on country/region of origin), social class, or the like. As another example, a lexicon that is specific to the speaker may be used during speech recognition and/or language translation. Such a lexicon may be determined based on prior communications of the speaker, profession of the speaker (e.g., engineer, attorney, doctor), or the like.

Once the AEFS 100 has translated an utterance in a first language into a message in a second language, the AEFS 100 can present the message in the second language. Various techniques are contemplated. In one approach, the AEFS 100 causes the conferencing device 120a (or some other device accessible to the user) to visually display the message on the display 121. In another approach, the AEFS 100 causes the conferencing device 120a (or some other device) to "speak" or "tell" the user/speaker 102a the message in the second language. Presenting a message in this manner may include converting a textual representation of the message into audio via text-to-speech processing (e.g., speech synthesis), and then presenting the audio via an audio speaker (e.g., earphone, earpiece, earbud) of the conferencing device 120a.

At least some of the techniques described above with respect to translation may be applied in the context of generating and recording conference history information. For example, speech recognition and natural language processing may be employed by the AEFS 100 to transcribe user utterances, determine topics of conversation, identify information items referenced by speakers, and the like.

FIG. 1B is an example block diagram illustrating various conferencing devices according to example embodiments. In particular, FIG. 1B illustrates an AEFS 100 in communication with example conferencing devices 120d-120f. Conferencing device 120d is a smart phone that includes a display 121a and an audio speaker 124. Conferencing device 120e is a laptop computer that includes a display 121b. Conferencing device 120f is an office telephone that includes a display 121c. Each of the illustrated conferencing devices 120 includes or may be communicatively coupled to a microphone operable to receive a speech signal from a speaker. As described above, the conferencing device 120 may then convert the speech signal into data representing the speech signal, and then forward the data to the AEFS 100.

As an initial matter, note that the AEFS 100 may use output devices of a conferencing device or other devices to present information to a user, such as speaker-related information and/or conference history information that may generally assist the user in engaging in a voice conference with other participants. For example, the AEFS 100 may present speaker-related information about a current or previous speaker, such as his name, title, communications that reference or are related to the speaker, and the like.

For audio output, each of the illustrated conferencing devices 120 may include or be communicatively coupled to an audio speaker operable to generate and output audio signals that may be perceived by the user 102. As discussed above, the AEFS 100 may use such a speaker to provide speaker-related information and/or conference history information to the user 102. The AEFS 100 may also or instead audibly notify, via a speaker of a conferencing device 120, the user 102 to view information displayed on the conferencing device 120. For example, the AEFS 100 may cause a tone (e.g., beep, chime) to be played via the earpiece of the telephone 120f. Such a tone may then be recognized by the user 102, who will in response attend to information displayed on the display 121c. Such audible notification may be used to identify a display that is being used as a current display, such as when multiple displays are being used. For example, different first and second tones may be used to direct the user's attention to the smart phone display 121a and laptop display 121b, respectively. In some embodiments, audible notification may include playing synthesized speech (e.g., from text-to-speech processing) telling the user 102 to view speaker-related information and/or conference history information on a particular display device (e.g., "See email on your smart phone").

The AEFS 100 may generally cause information (e.g., speaker-related information, conference history information, translations) to be presented on various destination output devices. In some embodiments, the AEFS 100 may use a display of a conferencing device as a target for displaying information. For example, the AEFS 100 may display information on the display 121a of the smart phone 120d. On the other hand, when the conferencing device does not have its own display or if the display is not suitable for displaying the determined information, the AEFS 100 may display information on some other destination display that is accessible to the user 102. For example, when the telephone 120f is the conferencing device and the user also has the laptop computer 120e in his possession, the AEFS 100 may elect to display an email or other substantial document upon the display 121b of the laptop computer 120e. Thus, as a general matter, a conferencing device may be any device with which a person may participate in a voice conference, by speaking, listening, seeing, or other interaction modality.

The AEFS 100 may determine a destination output device for conference history information, speaker-related information, translations, or other information. In some embodiments, determining a destination output device may include selecting from one of multiple possible destination displays based on whether a display is capable of displaying all of the information. For example, if the environment is noisy, the AEFS may elect to visually display a transcription or a translation rather than play it through a speaker. As another example, if the user 102 is proximate to a first display that is capable of displaying only text and a second display capable of displaying graphics, the AEFS 100 may select the second display when the presented information includes graphics content (e.g., an image). In some embodiments, determining a destination display may include selecting from one of multiple possible destination displays based on the size of each display. For example, a small LCD display (such as may be found on a mobile phone or telephone 120f) may be suitable for displaying a message that is just a few characters (e.g., a name or greeting) but not be suitable for displaying longer message or large document. Note that the AEFS 100 may select among multiple potential target output devices even when the conferencing device itself includes its own display and/or speaker.

Determining a destination output device may be based on other or additional factors. In some embodiments, the AEFS 100 may use user preferences that have been inferred (e.g., based on current or prior interactions with the user 102) and/or explicitly provided by the user. For example, the AEFS 100 may determine to present a transcription, translation, an email, or other speaker-related information onto the display 121a of the smart phone 120d based on the fact that the user 102 is currently interacting with the smart phone 120d.

Note that although the AEFS 100 is shown as being separate from a conferencing device 120, some or all of the functions of the AEFS 100 may be performed within or by the conferencing device 120 itself. For example, the smart phone conferencing device 120d and/or the laptop computer conferencing device 120e may have sufficient processing power to perform all or some functions of the AEFS 100, including one or more of speaker identification, determining speaker-related information, speaker recognition, speech recognition, generating and recording conference history information, language translation, presenting information, or the like. In some embodiments, the conferencing device 120 includes logic to determine where to perform various processing tasks, so as to advantageously distribute processing between available resources, including that of the conferencing device 120, other nearby devices (e.g., a laptop or other computing device of the user 102), remote devices (e.g., "cloud-based" processing and/or storage), and the like.

Other types of conferencing devices and/or organizations are contemplated. In some embodiments, the conferencing device may be a "thin" device, in that it may serve primarily as an output device for the AEFS 100. For example, an analog telephone may still serve as a conferencing device, with the AEFS 100 presenting speaker or history information via the earpiece of the telephone. As another example, a conferencing device may be or be part of a desktop computer, PDA, tablet computer, or the like.

Figure 1C:
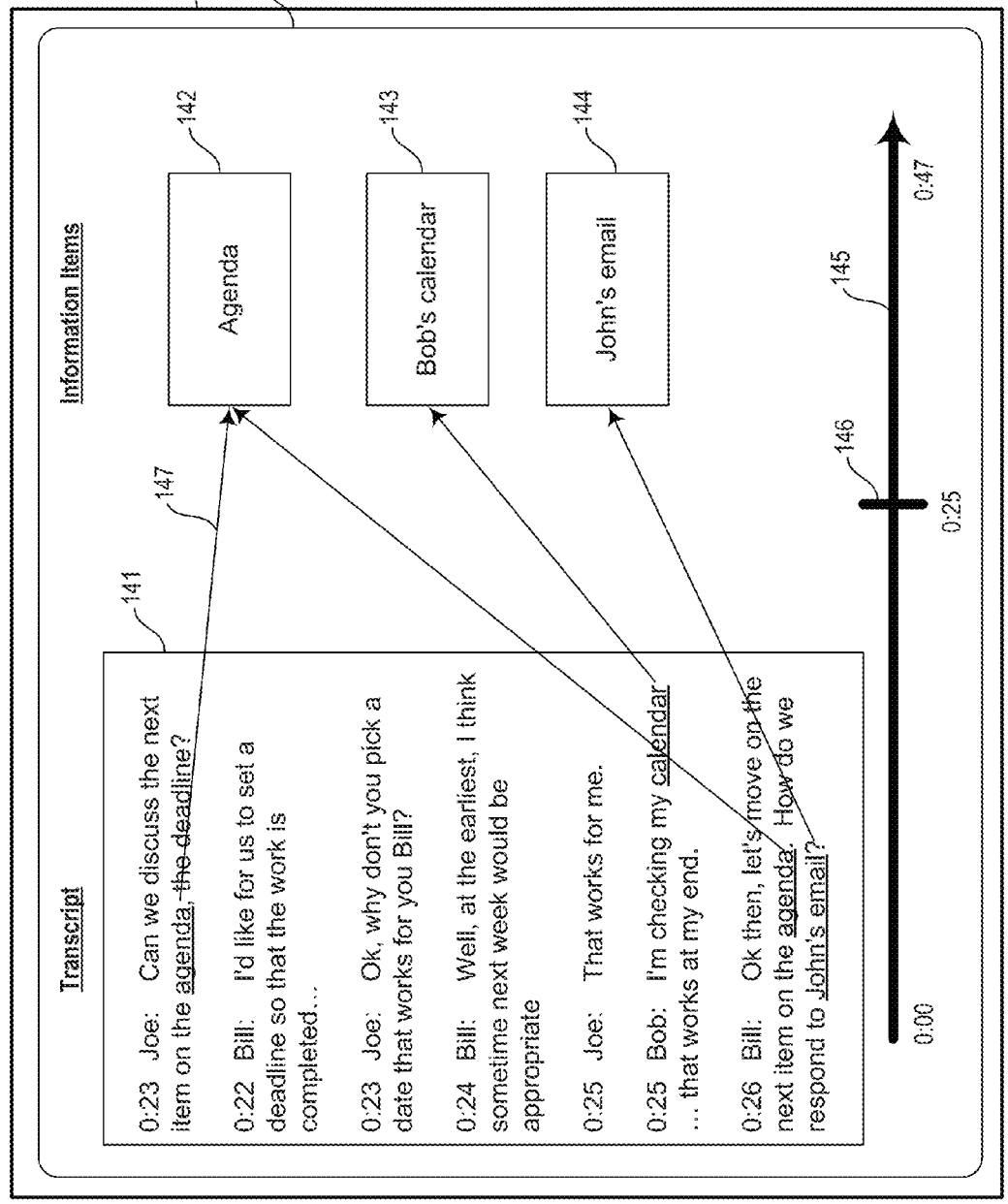
FIG. 1C is an example block diagram of an example user interface screen according to an example embodiment.

FIG. 1C is an example block diagram of an example user interface screen according to an example embodiment. In particular, FIG. 1C depicts a display 121 of a conferencing device or other computing device that is presenting a user interface 140 with which a user can interact to access (e.g., view, browse, read, skim) conference history information from a voice conference, such as the one described with respect to FIG. 1A.

The illustrated user interface 140 includes a transcript 141, information items 142-144, and a timeline control 145. The timeline control 145 includes a slider 146 that can be manipulated by the user (e.g., by dragging to the left or the right) to specify a time during the voice conference. In this example, the user has positioned the slider at 0:25, indicating a moment in time that is 25 minutes from the beginning of the voice conference.

In response to a time selection via the timeline control 146, the AEFS dynamically updates the information presented via the user interface 140. In this example, the transcript 140 is updated to present transcriptions of utterances from about the 25 minute mark of the voice conference. Each of the transcribed utterances includes a timestamp, a speaker identifier, and text. For example, the first displayed utterance was made at 23 minutes into the voice conference by speaker Joe and reads "Can we discuss the next item on the agenda, the deadline?" At 24 minutes into the voice conference, speaker Bill indicates that the deadline should be next week, stating "Well, at the earliest, I think sometime next week would be appropriate." At 25 minutes into the voice conference, speakers Joe and Bob agree by respectively uttering "That works for me" and "I'm checking my calendar . . . that works at my end."

The user interface 140 also presents information items that are related to the conference history information. In this example, the AEFS has identified and displayed three information items, including an agenda 142, a calendar 143, and an email 144. The user interface 140 may display the information items themselves (e.g., their content) and/or indications thereof (e.g., titles, icons, buttons) that may be used to access their contents. Each of the displayed information items was discussed or mentioned at or about the time specified via the timeline control 145. For example, at 23 and 26 minutes into the voice conference, speakers Joe and Bill each mentioned an "agenda." In the illustrated embodiment, the AEFS determines that the term "agenda" referred to a document, an indication of which is displayed as agenda 142. Note also that term "agenda" is highlighted in the transcript 141, such as via underlining. Note also that a link 147 is displayed that associates the term "agenda" in the transcript 141 with the agenda 142. As further examples, the terms "calendar" and "John's email" are respectively linked to the calendar 143 and the email 144.

Note that in some embodiments the time period within a conference history that is presented by the user interface 140 may be selected or updated automatically. For example, as a voice conference is in progress, the conference history will typically grow (as new items or transcriptions are added to the history). The user interface 140 may be configured to by default automatically display history information from a time window extending back a few minutes (e.g., one, two, five, ten) from the current time. In such situations, the user interface 140 may present a "rolling" display of the transcript 141 and associated information items.

As another example, when the AEFS identifies a topic of conversation, it may automatically update the user interface 140 to present conference history information relevant to that topic. For instance, in the example of FIG. 1A, the AEFS may determine that the speaker 102b (Bill) is referring to the deadline. In response, the AEFS may update the user interface 140 to present conference history information from any previous discussion(s) of that topic during the voice conference.

Figure 2:
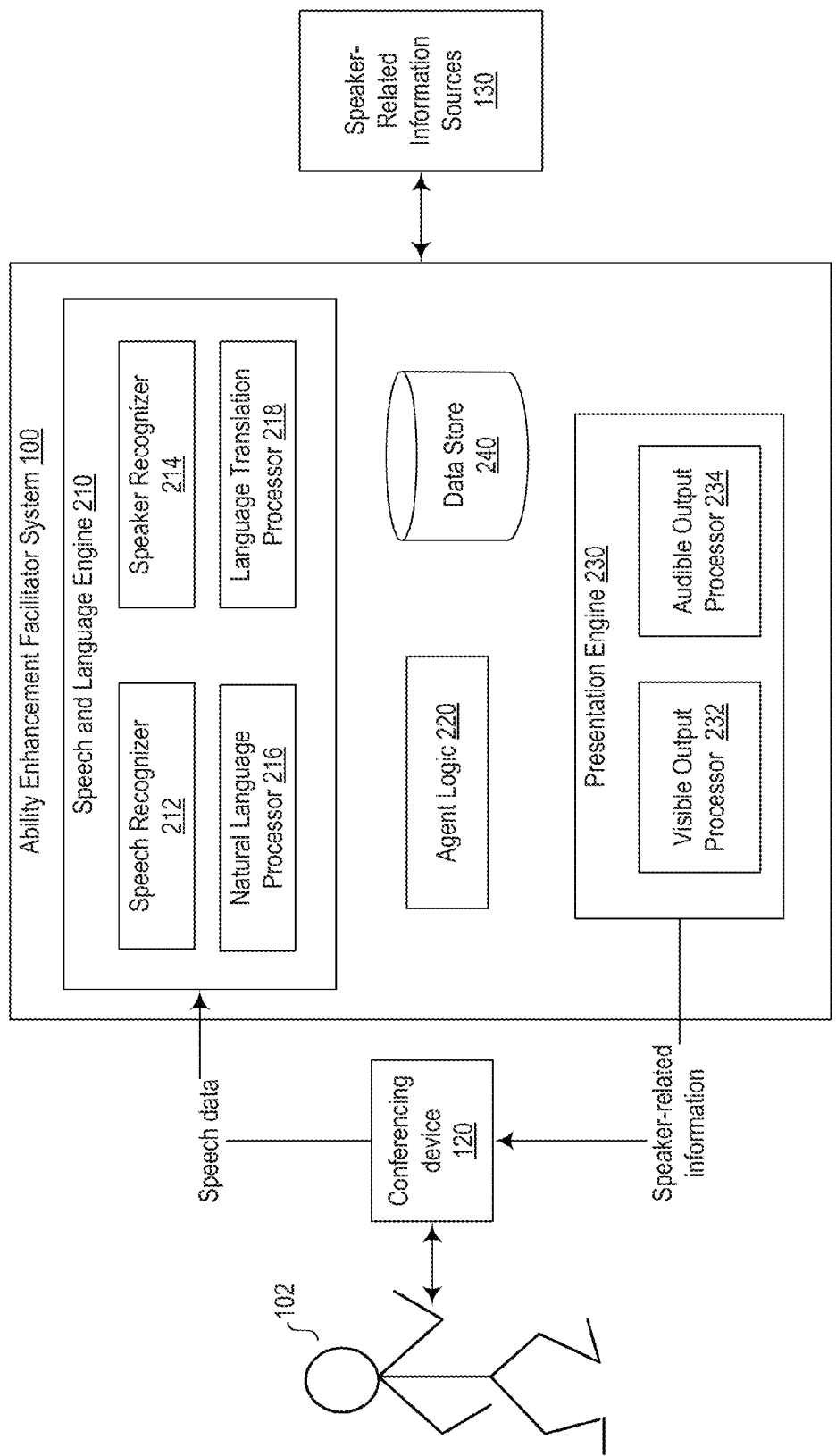
FIG. 2 is an example functional block diagram of an example ability enhancement facilitator system according to an example embodiment.

FIG. 2 is an example functional block diagram of an example ability enhancement facilitator system according to an example embodiment. In the illustrated embodiment of FIG. 2, the AEFS 100 includes a speech and language engine 210, agent logic 220, a presentation engine 230, and a data store 240.

The speech and language engine 210 includes a speech recognizer 212, a speaker recognizer 214, a natural language processor 216, and a language translation processor 218. The speech recognizer 212 transforms speech audio data received (e.g., from the conferencing device 120) into textual representation of an utterance represented by the speech audio data. In some embodiments, the performance of the speech recognizer 212 may be improved or augmented by use of a language model (e.g., representing likelihoods of transitions between words, such as based on n-grams) or speech model (e.g., representing acoustic properties of a speaker's voice) that is tailored to or based on an identified speaker. For example, once a speaker has been identified, the speech recognizer 212 may use a language model that was previously generated based on a corpus of communications and other information items authored by the identified speaker. A speaker-specific language model may be generated based on a corpus of documents and/or messages authored by a speaker. Speaker-specific speech models may be used to account for accents or channel properties (e.g., due to environmental factors or communication equipment) that are specific to a particular speaker, and may be generated based on a corpus of recorded speech from the speaker. In some embodiments, multiple speech recognizers are present, each one configured to recognize speech in a different language.

The speaker recognizer 214 identifies the speaker based on acoustic properties of the speaker's voice, as reflected by the speech data received from the conferencing device 120. The speaker recognizer 214 may compare a speaker voice print to previously generated and recorded voice prints stored in the data store 240 in order to find a best or likely match. Voice prints or other signal properties may be determined with reference to voice mail messages, voice chat data, or some other corpus of speech data.

The natural language processor 216 processes text generated by the speech recognizer 212 and/or located in information items obtained from the speaker-related information sources 130. In doing so, the natural language processor 216 may identify relationships, events, or entities (e.g., people, places, things) that may facilitate speaker identification, language translation, and/or other functions of the AEFS 100. For example, the natural language processor 216 may process status updates posted by the user 102a on a social networking service, to determine that the user 102a recently attended a conference in a particular city, and this fact may be used to identify a speaker and/or determine other speaker-related information, which may in turn be used for language translation or other functions.

In some embodiments, the natural language processor 216 may determine topics or subjects discussed during the course of a conference call or other conversation. Information/text processing techniques or metrics may be used to identify key terms or concepts from text obtained from a user utterances. For example, the natural language processor 216 may generate a term vector that associates text terms with frequency information including absolute counts, term frequency-inverse document frequency scores, or the like. The frequency information can then be used to identify important terms or concepts in the user's speech, such as by selecting those having a high score (e.g., above a certain threshold). Other text processing and/or machine learning techniques may be used to classify or otherwise determine concepts related to user utterances, including Bayesian classification, clustering, decision trees, and the like.

The language translation processor 218 translates from one language to another, for example, by converting text in a first language to text in a second language. The text input to the language translation processor 218 may be obtained from, for example, the speech recognizer 212 and/or the natural language processor 216. The language translation processor 218 may use speaker-related information to improve or adapt its performance. For example, the language translation processor 218 may use a lexicon or vocabulary that is tailored to the speaker, such as may be based on the speaker's country/region of origin, the speaker's social class, the speaker's profession, or the like.

The agent logic 220 implements the core intelligence of the AEFS 100. The agent logic 220 may include a reasoning engine (e.g., a rules engine, decision trees, Bayesian inference engine) that combines information from multiple sources to identify speakers, determine speaker-related information, generate voice conference history information, and the like. For example, the agent logic 220 may combine spoken text from the speech recognizer 212, a set of potentially matching (candidate) speakers from the speaker recognizer 214, and information items from the information sources 130, in order to determine a most likely identity of the current speaker. As another example, the agent logic 220 may be configured to search or otherwise analyze conference history information to identify recurring topics, information items, or the like. As a further example, the agent logic 220 may identify the language spoken by the speaker by analyzing the output of multiple speech recognizers that are each configured to recognize speech in a different language, to identify the language of the speech recognizer that returns the highest confidence result as the spoken language.

The presentation engine 230 includes a visible output processor 232 and an audible output processor 234. The visible output processer 232 may prepare, format, and/or cause information to be displayed on a display device, such as a display of the conferencing device 120 or some other display (e.g., a desktop or laptop display in proximity to the user 102a). The agent logic 220 may use or invoke the visible output processor 232 to prepare and display information, such as by formatting or otherwise modifying a transcription, translation, or some speaker-related information to fit on a particular type or size of display. The audible output processor 234 may include or use other components for generating audible output, such as tones, sounds, voices, or the like. In some embodiments, the agent logic 220 may use or invoke the audible output processor 234 in order to convert a textual message (e.g., including or referencing speaker-related information) into audio output suitable for presentation via the conferencing device 120, for example by employing a text-to-speech processor.

Note that although speaker identification and/or determining speaker-related information is herein sometimes described as including the positive identification of a single speaker, it may instead or also include determining likelihoods that each of one or more persons is the current speaker. For example, the speaker recognizer 214 may provide to the agent logic 220 indications of multiple candidate speakers, each having a corresponding likelihood or confidence level. The agent logic 220 may then select the most likely candidate based on the likelihoods alone or in combination with other information, such as that provided by the speech recognizer 212, natural language processor 216, speaker-related information sources 130, or the like. In some cases, such as when there are a small number of reasonably likely candidate speakers, the agent logic 220 may inform the user 102a of the identities all of the candidate speakers (as opposed to a single speaker) candidate speaker, as such information may be sufficient to trigger the user's recall and enable the user to make a selection that informs the agent logic 220 of the speaker's identity.

Note that in some embodiments, one or more of the illustrated components, or components of different types, may be included or excluded. For example, in one embodiment, the AEFS 100 does not include the language translation processor 218.

2. Example Processes

FIGS. 3.1-3.94 are example flow diagrams of ability enhancement processes performed by example embodiments.

FIG. 3.1 is an example flow diagram of example logic for ability enhancement. The illustrated logic in this and the following flow diagrams may be performed by, for example, a conferencing device 120 and/or one or more components of the AEFS 100 described with respect to FIG. 2, above. More particularly, FIG. 3.1 illustrates a process 3.100 that includes operations performed by or at the following block(s).

At block 3.103, the process performs receiving data representing speech signals from a voice conference amongst multiple speakers. The voice conference may be, for example, taking place between multiple speakers who are engaged in a conference call. The received data may be or represent one or more speech signals (e.g., audio samples) and/or higher-order information (e.g., frequency coefficients). In some embodiments, the process may receive data from a face-to-face conference amongst the speakers. The data may be received by or at the conferencing device 120 and/or the AEFS 100.

At block 3.105, the process performs determining speaker-related information associated with the multiple speakers, based on the data representing speech signals from the voice conference. The speaker-related information may include identifiers of a speaker (e.g., names, titles) and/or related information, such as documents, emails, calendar events, or the like. The speaker-related information may also or instead include demographic information about a speaker, including gender, language spoken, country of origin, region of origin, or the like. The speaker-related information may be determined based on signal properties of speech signals (e.g., a voice print) and/or on the semantic content of the speech signal, such as a name, event, entity, or information item that was mentioned by a speaker.

At block 3.107, the process performs recording conference history information based on the speaker-related information. In some embodiments, the process may record the voice conference and related information, so that such information can be played back at a later time, such as for reference purposes, for a participant who joins the conference late, or the like. The conference history information may associate timestamps or other time indicators with information from the voice conference, including speaker identifiers, transcriptions of speaker utterances, indications of discussion topics, mentioned information items, or the like.

At block 3.109, the process performs presenting at least some of the conference history information to a user. Presenting the conference history information may include playing back audio, displaying a transcript, presenting indications topics of conversation, or the like. In some embodiments, the conference history information may be presented on a display of a conferencing device (if it has one) or on some other display, such as a laptop or desktop display that is proximately located to the user. The conference history information may be presented in an audible and/or visible manner.

FIG. 3.2 is an example flow diagram of example logic illustrating an example embodiment of process 3.100 of FIG. 3.1. More particularly, FIG. 3.2 illustrates a process 3.200 that includes the process 3.100, wherein the recording conference history information based on the speaker-related information includes operations performed by or at the following block(s).

At block 3.204, the process performs recording a transcription of utterances made by speakers during the voice conference. If the process performs speech recognition as discussed herein, it may record the results of such speech recognition as a transcription of the voice conference.

FIG. 3.3 is an example flow diagram of example logic illustrating an example embodiment of process 3.200 of FIG. 3.2. More particularly, FIG. 3.3 illustrates a process 3.300 that includes the process 3.200, wherein the recording a transcription includes operations performed by or at the following block(s).

At block 3.304, the process performs performing speech recognition to convert data representing a speech signal from one of the multiple speakers into text. In some embodiments, the process performs automatic speech recognition to convert audio data into text. Various approaches may be employed, including using hidden Markov models ("HMM"), neural networks, or the like. The data representing the speech signal may be frequency coefficients, such as mel-frequency coefficients or a similar representation adapted for automatic speech recognition.

At block 3.305, the process performs storing the text in association with an indicator of the one speaker. The text may be stored in a data store (e.g., disk, database, file) of the AEFS, a conferencing device, or some other system, such as a cloud-based storage system.

FIG. 3.4 is an example flow diagram of example logic illustrating an example embodiment of process 3.100 of FIG. 3.1. More particularly, FIG. 3.4 illustrates a process 3.400 that includes the process 3.100, wherein the recording conference history information based on the speaker-related information includes operations performed by or at the following block(s).

At block 3.404, the process performs recording indications of topics discussed during the voice conference. Topics of conversation may be identified in various ways. For example, the process may track entities or terms that are commonly mentioned during the course of the voice conference. Various text processing techniques or metrics may be applied to identify key terms or concepts, such as term frequencies, inverse document frequencies, and the like. As another example, the process may attempt to identify agenda items which are typically discussed early in the voice conference. The process may also or instead refer to messages or other information items that are related to the voice conference, such as by analyzing email headers (e.g., subject lines) of email messages sent between participants in the voice conference.

FIG. 3.5 is an example flow diagram of example logic illustrating an example embodiment of process 3.400 of FIG. 3.4. More particularly, FIG. 3.5 illustrates a process 3.500 that includes the process 3.400, wherein the recording indications of topics discussed during the voice conference includes operations performed by or at the following block(s).

At block 3.504, the process performs performing speech recognition to convert the data representing speech signals into text. As noted, some embodiments perform speech recognition to convert audio data into text data.

At block 3.505, the process performs analyzing the text to identify frequently used terms or phrases. In some embodiments, the process maintains a term vector or other structure with respect to a transcript (or window or portion thereof) of the voice conference. The term vector may associate terms with information about corresponding frequency, such as term counts, term frequency, document frequency, inverse document frequency, or the like. The text may be processed in other ways as well, such as by stemming, stop word filtering, or the like.

At block 3.506, the process performs determining the topics discussed during the voice conference based on the frequently used terms or phrases. Terms having a high information retrieval metric value, such as term frequency or TF-IDF (term frequency-inverse document frequency), may be identified as topics of conversation. Other information processing techniques may be employed instead or in addition, such as Bayesian classification, decision trees, or the like.

FIG. 3.6 is an example flow diagram of example logic illustrating an example embodiment of process 3.100 of FIG. 3.1. More particularly, FIG. 3.6 illustrates a process 3.600 that includes the process 3.100, wherein the recording conference history information based on the speaker-related information includes operations performed by or at the following block(s).

At block 3.604, the process performs recording indications of information items related to subject matter of the voice conference. The process may track information items that are mentioned during the voice conference or otherwise related to participants in the voice conference, such as emails sent between participants in the voice conference.

FIG. 3.7 is an example flow diagram of example logic illustrating an example embodiment of process 3.600 of FIG. 3.6. More particularly, FIG. 3.7 illustrates a process 3.700 that includes the process 3.600, wherein the recording indications of information items related to subject matter of the voice conference includes operations performed by or at the following block(s).

At block 3.704, the process performs performing speech recognition to convert the data representing speech signals into text. As noted, some embodiments perform speech recognition to convert audio data into text data.

At block 3.705, the process performs analyzing the text to identify information items mentioned by the speakers. The process may use terms from the text to perform searches against a document store, email database, search index, or the like, in order to locate information items (e.g., messages, documents) that include one or more of those text terms as content or metadata (e.g., author, title, date). The process may also or instead attempt to identify information about information items, such as author, date, or title, based on the text. For example, from the text "I sent an email to John last week" the process may determine that an email message was sent to a user named John during the last week, and then use that information to narrow a search for such an email message.

FIG. 3.8 is an example flow diagram of example logic illustrating an example embodiment of process 3.100 of FIG. 3.1. More particularly, FIG. 3.8 illustrates a process 3.800 that includes the process 3.100, wherein the recording conference history information based on the speaker-related information includes operations performed by or at the following block(s).

At block 3.804, the process performs recording the data representing speech signals from the voice conference. The process may record speech, and then use such recordings for later playback, as a source for transcription, or for other purposes. The data may be recorded in various ways and/or formats, including in compressed formats.

FIG. 3.9 is an example flow diagram of example logic illustrating an example embodiment of process 3.100 of FIG. 3.1. More particularly, FIG. 3.9 illustrates a process 3.900 that includes the process 3.100, wherein the recording conference history information based on the speaker-related information includes operations performed by or at the following block(s).

At block 3.904, the process performs as each of the multiple speakers takes a turn speaking during the voice conference, recording speaker-related information associated with the speaker. The process may, in substantially real time, record speaker-related information associated a current speaker, such as a name of the speaker, a message sent by the speaker, a document drafted by the speaker, or the like.

FIG. 3.10 is an example flow diagram of example logic illustrating an example embodiment of process 3.100 of FIG. 3.1. More particularly, FIG. 3.10 illustrates a process 3.1000 that includes the process 3.100, wherein the recording conference history information based on the speaker-related information includes operations performed by or at the following block(s).

At block 3.1004, the process performs recording conference history information based on the speaker-related information during a telephone conference call amongst the multiple speakers. In some embodiments, the process operates to record information about a telephone conference, even when some or all of the speakers are using POTS (plain old telephone service) telephones.

FIG. 3.11 is an example flow diagram of example logic illustrating an example embodiment of process 3.100 of FIG. 3.1. More particularly, FIG. 3.11 illustrates a process 3.1100 that includes the process 3.100, wherein the presenting at least some of the conference history information includes operations performed by or at the following block(s).

At block 3.1104, the process performs presenting the conference history information to a new participant in the voice conference, the new participant having joined the voice conference while the voice conference was already in progress. In some embodiments, the process may play back history information to a late arrival to the voice conference, so that the new participant may catch up with the conversation without needing to interrupt the proceedings.

FIG. 3.12 is an example flow diagram of example logic illustrating an example embodiment of process 3.100 of FIG. 3.1. More particularly, FIG. 3.12 illustrates a process 3.1200 that includes the process 3.100, wherein the presenting at least some of the conference history information includes operations performed by or at the following block(s).

At block 3.1204, the process performs presenting the conference history information to a participant in the voice conference, the participant having rejoined the voice conference after having not participated in the voice conference for a period of time. In some embodiments, the process may play back history information to a participant who leaves and then rejoins the conference, for example when a participant temporarily leaves to visit the restroom, obtain some food, or attend to some other matter.

FIG. 3.13 is an example flow diagram of example logic illustrating an example embodiment of process 3.1200 of FIG. 3.12. More particularly, FIG. 3.13 illustrates a process 3.1300 that includes the process 3.1200, wherein the participant rejoins the voice conference after at least one of: pausing the voice conference, muting the voice conference, holding the voice conference, voluntarily leaving the voice conference, and/or involuntarily leaving the voice conference. The participant may rejoin the voice conference for various reasons, such as because he has voluntarily left the voice conference (e.g., to attend to another matter), involuntarily left the voice conference (e.g., because the call was dropped), or the like.

FIG. 3.14 is an example flow diagram of example logic illustrating an example embodiment of process 3.100 of FIG. 3.1. More particularly, FIG. 3.14 illustrates a process 3.1400 that includes the process 3.100, wherein the presenting at least some of the conference history information includes operations performed by or at the following block(s).

At block 3.1404, the process performs presenting the conference history information to a user after conclusion of the voice conference. The process may record the conference history information such that it can be presented at a later date, such as for reference purposes, for legal analysis (e.g., as a deposition), or the like.

FIG. 3.15 is an example flow diagram of example logic illustrating an example embodiment of process 3.100 of FIG. 3.1. More particularly, FIG. 3.15 illustrates a process 3.1500 that includes the process 3.100, wherein the presenting at least some of the conference history information includes operations performed by or at the following block(s).

At block 3.1504, the process performs providing a user interface configured to access the conference history information by scrolling through a temporal record of the voice conference. As discussed with reference to FIG. 1C, some embodiments provide a user interface and associated controls for scrolling through the conference history information. Such an interface may include a timeline control, VCR-style controls (e.g., with buttons for forward, reverse, pause), touchscreen controls (e.g., swipe left and right), or the like for manipulating or traversing the conference history information. Other controls are contemplated, including a search interface for searching a transcript of the voice conference.

FIG. 3.16 is an example flow diagram of example logic illustrating an example embodiment of process 3.100 of FIG. 3.1. More particularly, FIG. 3.16 illustrates a process 3.1600 that includes the process 3.100, wherein the presenting at least some of the conference history information includes operations performed by or at the following block(s).

At block 3.1604, the process performs presenting a transcription of utterances made by speakers during the voice conference. The process may present text of what was said (and by whom) during the voice conference. The process may also mark or associate utterances with timestamps or other time indicators.

FIG. 3.17 is an example flow diagram of example logic illustrating an example embodiment of process 3.100 of FIG. 3.1. More particularly, FIG. 3.17 illustrates a process 3.1700 that includes the process 3.100, wherein the presenting at least some of the conference history information includes operations performed by or at the following block(s).

At block 3.1704, the process performs presenting indications of topics discussed during the voice conference. The process may present indications of topics discussed, such as may be determined based on terms used by speakers during the conference, as discussed above.

FIG. 3.18 is an example flow diagram of example logic illustrating an example embodiment of process 3.100 of FIG. 3.1. More particularly, FIG. 3.18 illustrates a process 3.1800 that includes the process 3.100, wherein the presenting at least some of the conference history information includes operations performed by or at the following block(s).

At block 3.1804, the process performs presenting indications of information items related to subject matter of the voice conference. The process may present relevant information items, such as emails, documents, plans, agreements, or the like mentioned or referenced by one or more speakers. In some embodiments, the information items may be related to the content of the discussion, such as because they include common key terms, even if the information items have not been directly referenced by any speaker.

FIG. 3.19 is an example flow diagram of example logic illustrating an example embodiment of process 3.100 of FIG. 3.1. More particularly, FIG. 3.19 illustrates a process 3.1900 that includes the process 3.100, wherein the presenting at least some of the conference history information includes operations performed by or at the following block(s).

At block 3.1904, the process performs presenting, while a current speaker is speaking, conference history information on a display device of the user, the displayed conference history information providing information related to previous statements made by the current speaker. For example, as the user engages in a conference call from his office, the process may present information related to statements made at an earlier time during the current voice conference or some previous voice conference.

FIG. 3.20 is an example flow diagram of example logic illustrating an example embodiment of process 3.100 of FIG. 3.1. More particularly, FIG. 3.20 illustrates a process 3.2000 that includes the process 3.100 and which further includes operations performed by or at the following block(s).

At block 3.2004, the process performs performing voice identification based on the data representing the speech signals from the voice conference. In some embodiments, voice identification may include generating a voice print, voice model, or other biometric feature set that characterizes the voice of the speaker, and then comparing the generated voice print to previously generated voice prints.

FIG. 3.21 is an example flow diagram of example logic illustrating an example embodiment of process 3.2000 of FIG. 3.20. More particularly, FIG. 3.21 illustrates a process 3.2100 that includes the process 3.2000, wherein the performing voice identification includes operations performed by or at the following block(s).

At block 3.2104, the process performs in a conference call system, matching a portion of the data representing the speech signals with an identity of one of the multiple speakers, based on a communication channel that is associated with the one speaker and over which the portion of the data is transmitted. In some embodiments, a conference call system includes or accesses multiple distant communication channels (e.g., phone lines, sockets, pipes) that each transmit data from one of the multiple speakers. In such a situation, the conference call system can match the identity of a speaker with audio data transmitted over that speaker's communication channel.

FIG. 3.22 is an example flow diagram of example logic illustrating an example embodiment of process 3.2000 of FIG. 3.20. More particularly, FIG. 3.22 illustrates a process 3.2200 that includes the process 3.2000, wherein the performing voice identification includes operations performed by or at the following block(s).

At block 3.2204, the process performs comparing properties of the speech signal with properties of previously recorded speech signals from multiple persons. In some embodiments, the process accesses voice prints associated with multiple persons, and determines a best match against the speech signal.

FIG. 3.23 is an example flow diagram of example logic illustrating an example embodiment of process 3.2200 of FIG. 3.22. More particularly, FIG. 3.23 illustrates a process 3.2300 that includes the process 3.2200 and which further includes operations performed by or at the following block(s).

At block 3.2304, the process performs processing voice messages from the multiple persons to generate voice print data for each of the multiple persons. Given a telephone voice message, the process may associate generated voice print data for the voice message with one or more (direct or indirect) identifiers corresponding with the message. For example, the message may have a sender telephone number associated with it, and the process can use that sender telephone number to do a reverse directory lookup (e.g., in a public directory, in a personal contact list) to determine the name of the voice message speaker.

FIG. 3.24 is an example flow diagram of example logic illustrating an example embodiment of process 3.2300 of FIG. 3.23. More particularly, FIG. 3.24 illustrates a process 3.2400 that includes the process 3.2300, wherein the processing voice messages includes operations performed by or at the following block(s).

At block 3.2404, the process performs processing telephone voice messages stored by a voice mail service. In some embodiments, the process analyzes voice messages to generate voice prints/models for multiple persons.

FIG. 3.25 is an example flow diagram of example logic illustrating an example embodiment of process 3.100 of FIG. 3.1. More particularly, FIG. 3.25 illustrates a process 3.2500 that includes the process 3.100 and which further includes operations performed by or at the following block(s).

At block 3.2504, the process performs performing speech recognition to convert the data representing speech signals into text data. For example, the process may convert the received data into a sequence of words that are (or are likely to be) the words uttered by a speaker. Speech recognition may be performed by way of hidden Markov model-based systems, neural networks, stochastic modeling, or the like. In some embodiments, the speech recognition may be based on cepstral coefficients that represent the speech signal.

FIG. 3.26 is an example flow diagram of example logic illustrating an example embodiment of process 3.2500 of FIG. 3.25. More particularly, FIG. 3.26 illustrates a process 3.2600 that includes the process 3.2500, wherein the determining speaker-related information associated with the multiple speakers includes operations performed by or at the following block(s).

At block 3.2604, the process performs finding an information item that references the one speaker and/or that includes one or more words in the text data. In some embodiments, the process may search for and find a document or other item (e.g., email, text message, status update) that includes words spoken by one speaker. Then, the process can infer that the one speaker is the author of the document, a recipient of the document, a person described in the document, or the like.

FIG. 3.27 is an example flow diagram of example logic illustrating an example embodiment of process 3.2500 of FIG. 3.25. More particularly, FIG. 3.27 illustrates a process 3.2700 that includes the process 3.2500 and which further includes operations performed by or at the following block(s).

At block 3.2704, the process performs retrieving information items that reference the text data. The process may here retrieve or otherwise obtain documents, calendar events, messages, or the like, that include, contain, or otherwise reference some portion of the text data.

At block 3.2706, the process performs informing the user of the retrieved information items. The information item itself, or an indication thereof (e.g., a title, a link), may be displayed.

FIG. 3.28 is an example flow diagram of example logic illustrating an example embodiment of process 3.2500 of FIG. 3.25. More particularly, FIG. 3.28 illustrates a process 3.2800 that includes the process 3.2500, wherein the performing speech recognition includes operations performed by or at the following block(s).

At block 3.2804, the process performs performing speech recognition based at least in part on a language model associated with the one speaker. A language model may be used to improve or enhance speech recognition. For example, the language model may represent word transition likelihoods (e.g., by way of n-grams) that can be advantageously employed to enhance speech recognition. Furthermore, such a language model may be speaker specific, in that it may be based on communications or other information generated by the one speaker.

FIG. 3.29 is an example flow diagram of example logic illustrating an example embodiment of process 3.2800 of FIG. 3.28. More particularly, FIG. 3.29 illustrates a process 3.2900 that includes the process 3.2800, wherein the performing speech recognition based at least in part on a language model associated with the one speaker includes operations performed by or at the following block(s).

At block 3.2904, the process performs generating the language model based on information items generated by the one speaker, the information items including at least one of emails transmitted by the one speaker, documents authored by the one speaker, and/or social network messages transmitted by the one speaker. In some embodiments, the process mines or otherwise processes emails, text messages, voice messages, and the like to generate a language model that is specific or otherwise tailored to the one speaker.

FIG. 3.30 is an example flow diagram of example logic illustrating an example embodiment of process 3.2800 of FIG. 3.28. More particularly, FIG. 3.30 illustrates a process 3.3000 that includes the process 3.2800, wherein the performing speech recognition based at least in part on a language model associated with the one speaker includes operations performed by or at the following block(s).

At block 3.3004, the process performs generating the language model based on information items generated by or referencing any of the multiple speakers, the information items including emails, documents, and/or social network messages. In some embodiments, the process mines or otherwise processes emails, text messages, voice messages, and the like generated by or referencing any of the multiple speakers to generate a language model that is tailored to the current conversation.

FIG. 3.31 is an example flow diagram of example logic illustrating an example embodiment of process 3.100 of FIG. 3.1. More particularly, FIG. 3.31 illustrates a process 3.3100 that includes the process 3.100, wherein the determining speaker-related information associated with the multiple speakers includes operations performed by or at the following block(s).

At block 3.3104, the process performs determining which one of the multiple speakers is speaking during a time interval. The process may determine which one of the speakers is currently speaking, even if the identity of the current speaker is not known. Various approaches may be employed, including detecting the source of a speech signal, performing voice identification, or the like.

FIG. 3.32 is an example flow diagram of example logic illustrating an example embodiment of process 3.3100 of FIG. 3.31. More particularly, FIG. 3.32 illustrates a process 3.3200 that includes the process 3.3100, wherein the determining which one of the multiple speakers is speaking during a time interval includes operations performed by or at the following block(s).

At block 3.3204, the process performs associating a first portion of the received data with a first one of the multiple speakers. The process may correspond, bind, link, or otherwise associate a portion of the received data with a speaker. Such an association may then be used for further processing, such as voice identification, speech recognition, or the like.

FIG. 3.33 is an example flow diagram of example logic illustrating an example embodiment of process 3.3200 of FIG. 3.32. More particularly, FIG. 3.33 illustrates a process 3.3300 that includes the process 3.3200, wherein the associating a first portion of the received data with a first one of the multiple speakers includes operations performed by or at the following block(s).

At block 3.3304, the process performs receiving the first portion of the received data along with an identifier associated with the first speaker. In some embodiments, the process may receive data along with an identifier, such as an IP address (e.g., in a voice over IP conferencing system). Some conferencing systems may provide an identifier (e.g., telephone number) of a current speaker by detecting which telephone line or other circuit (virtual or physical) has an active signal.

FIG. 3.34 is an example flow diagram of example logic illustrating an example embodiment of process 3.3200 of FIG. 3.32. More particularly, FIG. 3.34 illustrates a process 3.3400 that includes the process 3.3200, wherein the associating a first portion of the received data with a first one of the multiple speakers includes operations performed by or at the following block(s).

At block 3.3404, the process performs selecting the first portion based on the first portion representing only speech from the one speaker and no other of the multiple speakers. The process may select a portion of the received data based on whether or not the received data includes speech from only one, or more than one speaker (e.g., when multiple speakers are talking over each other).

FIG. 3.35 is an example flow diagram of example logic illustrating an example embodiment of process 3.3100 of FIG. 3.31. More particularly, FIG. 3.35 illustrates a process 3.3500 that includes the process 3.3100 and which further includes operations performed by or at the following block(s).

At block 3.3504, the process performs determining that two or more of the multiple speakers are speaking concurrently. The process may determine the multiple speakers are talking at the same time, and take action accordingly. For example, the process may elect not to attempt to identify any speaker, or instead identify all of the speakers who are talking out of turn.

FIG. 3.36 is an example flow diagram of example logic illustrating an example embodiment of process 3.3100 of FIG. 3.31. More particularly, FIG. 3.36 illustrates a process 3.3600 that includes the process 3.3100, wherein the determining which one of the multiple speakers is speaking during a time interval includes operations performed by or at the following block(s).

At block 3.3604, the process performs performing voice identification to select which one of multiple previously analyzed voices is a best match for the one speaker who is speaking during the time interval. As noted above, voice identification may be employed to determine the current speaker.

FIG. 3.37 is an example flow diagram of example logic illustrating an example embodiment of process 3.3100 of FIG. 3.31. More particularly, FIG. 3.37 illustrates a process 3.3700 that includes the process 3.3100, wherein the determining which one of the multiple speakers is speaking during a time interval includes operations performed by or at the following block(s).

At block 3.3704, the process performs performing speech recognition to convert the received data into text data. For example, the process may convert the received data into a sequence of words that are (or are likely to be) the words uttered by a speaker. Speech recognition may be performed by way of hidden Markov model-based systems, neural networks, stochastic modeling, or the like. In some embodiments, the speech recognition may be based on cepstral coefficients that represent the speech signal.

At block 3.3706, the process performs identifying one of the multiple speakers based on the text data. Given text data (e.g., words spoken by a speaker), the process may search for information items that include the text data, and then identify the one speaker based on those information items.

FIG. 3.38 is an example flow diagram of example logic illustrating an example embodiment of process 3.3700 of FIG. 3.37. More particularly, FIG. 3.38 illustrates a process 3.3800 that includes the process 3.3700, wherein the identifying one of the multiple speakers based on the text data includes operations performed by or at the following block(s).

At block 3.3804, the process performs finding an information item that references the one speaker and that includes one or more words in the text data. In some embodiments, the process may search for and find a document or other item (e.g., email, text message, status update) that includes words spoken by one speaker. Then, the process can infer that the one speaker is the author of the document, a recipient of the document, a person described in the document, or the like.

FIG. 3.39 is an example flow diagram of example logic illustrating an example embodiment of process 3.100 of FIG. 3.1. More particularly, FIG. 3.39 illustrates a process 3.3900 that includes the process 3.100, wherein the determining speaker-related information associated with the multiple speakers includes operations performed by or at the following block(s).

At block 3.3904, the process performs developing a corpus of speaker data by recording speech from multiple persons. Over time, the process may gather and record speech obtained during its operation and/or from the operation of other systems (e.g., voice mail systems, chat systems).

At block 3.3905, the process performs determining the speaker-related information based at least in part on the corpus of speaker data. The process may use the speaker data in the corpus to improve its performance by utilizing actual, environmental speech data, possibly along with feedback received from the user, as discussed below.

FIG. 3.40 is an example flow diagram of example logic illustrating an example embodiment of process 3.3900 of FIG. 3.39. More particularly, FIG. 3.40 illustrates a process 3.4000 that includes the process 3.3900 and which further includes operations performed by or at the following block(s).

At block 3.4004, the process performs generating a speech model associated with each of the multiple persons, based on the recorded speech. The generated speech model may include voice print data that can be used for speaker identification, a language model that may be used for speech recognition purposes, a noise model that may be used to improve operation in speaker-specific noisy environments.

FIG. 3.41 is an example flow diagram of example logic illustrating an example embodiment of process 3.3900 of FIG. 3.39. More particularly, FIG. 3.41 illustrates a process 3.4100 that includes the process 3.3900 and which further includes operations performed by or at the following block(s).

At block 3.4104, the process performs receiving feedback regarding accuracy of the conference history information. During or after providing conference history information to the user, the user may provide feedback regarding its accuracy. This feedback may then be used to train a speech processor (e.g., a speaker identification module, a speech recognition module).

At block 3.4105, the process performs training a speech processor based at least in part on the received feedback.

FIG. 3.42 is an example flow diagram of example logic illustrating an example embodiment of process 3.100 of FIG. 3.1. More particularly, FIG. 3.42 illustrates a process 3.4200 that includes the process 3.100, wherein the determining speaker-related information associated with the multiple speakers includes operations performed by or at the following block(s).

At block 3.4204, the process performs receiving context information related to the user and/or one of the multiple speakers. Context information may generally include information about the setting, location, occupation, communication, workflow, or other event or factor that is present at, about, or with respect to the user and/or one or more of the speakers.

At block 3.4206, the process performs determining speaker-related information associated with the multiple speakers, based on the context information. Context information may be used to determine speaker-related information, such as by determining or narrowing a set of potential speakers based on the current location of a user and/or a speaker.

FIG. 3.43 is an example flow diagram of example logic illustrating an example embodiment of process 3.4200 of FIG. 3.42. More particularly, FIG. 3.43 illustrates a process 3.4300 that includes the process 3.4200, wherein the receiving context information includes operations performed by or at the following block(s).

At block 3.4304, the process performs receiving an indication of a location of the user or the one speaker.

At block 3.4306, the process performs determining a plurality of persons with whom the user or the one speaker commonly interacts at the location. For example, if the indicated location is a workplace, the process may generate a list of co-workers, thereby reducing or simplifying the problem of speaker identification.

FIG. 3.44 is an example flow diagram of example logic illustrating an example embodiment of process 3.4300 of FIG. 3.43. More particularly, FIG. 3.44 illustrates a process 3.4400 that includes the process 3.4300, wherein the receiving an indication of a location of the user or the one speaker includes operations performed by or at the following block(s).

At block 3.4404, the process performs receiving at least one of a GPS location from a mobile device of the user or the one speaker, a network identifier that is associated with the location, an indication that the user or the one speaker is at a workplace, an indication that the user or the one speaker is at a residence, an information item that references the user or the one speaker, an information item that references the location of the user or the one speaker. A network identifier may be, for example, a service set identifier ("SSID") of a wireless network with which the user is currently associated. In some embodiments, the process may translate a coordinate-based location (e.g., GPS coordinates) to a particular location (e.g., residence or workplace) by performing a map lookup.

FIG. 3.45 is an example flow diagram of example logic illustrating an example embodiment of process 3.100 of FIG. 3.1. More particularly, FIG. 3.45 illustrates a process 3.4500 that includes the process 3.100, wherein the presenting at least some of the conference history information includes operations performed by or at the following block(s).

At block 3.4504, the process performs presenting the conference history information on a display of a conferencing device of the user. In some embodiments, the conferencing device may include a display. For example, where the conferencing device is a smart phone or laptop computer, the conferencing device may include a display that provides a suitable medium for presenting the name or other identifier of the speaker.

FIG. 3.46 is an example flow diagram of example logic illustrating an example embodiment of process 3.100 of FIG. 3.1. More particularly, FIG. 3.46 illustrates a process 3.4600 that includes the process 3.100, wherein the presenting at least some of the conference history information includes operations performed by or at the following block(s).

At block 3.4604, the process performs presenting the conference history information on a display of a computing device that is distinct from a conferencing device of the user. In some embodiments, the conferencing device may not itself include any display or a display suitable for presenting conference history information. For example, where the conferencing device is an office phone, the process may elect to present the speaker-related information on a display of a nearby computing device, such as a desktop or laptop computer in the vicinity of the phone.

FIG. 3.47 is an example flow diagram of example logic illustrating an example embodiment of process 3.100 of FIG. 3.1. More particularly, FIG. 3.47 illustrates a process 3.4700 that includes the process 3.100, wherein the presenting at least some of the conference history information includes operations performed by or at the following block(s).

At block 3.4704, the process performs determining a display to serve as a presentation device for the conference history information. In some embodiments, there may be multiple displays available as possible destinations for the conference history information. For example, in an office setting, where the conferencing device is an office phone, the office phone may include a small LCD display suitable for displaying a few characters or at most a few lines of text. However, there will typically be additional devices in the vicinity of the conferencing device, such as a desktop/laptop computer, a smart phone, a PDA, or the like. The process may determine to use one or more of these other display devices, possibly based on the type of the conference history information being displayed.

FIG. 3.48 is an example flow diagram of example logic illustrating an example embodiment of process 3.4700 of FIG. 3.47. More particularly, FIG. 3.48 illustrates a process

3.4800 that includes the process 3.4700, wherein the determining a display includes operations performed by or at the following block(s).

At block 3.4804, the process performs selecting one display from multiple displays, based on at least one of: whether each of the multiple displays is capable of displaying all of the conference history information, the size of each of the multiple displays, and/or whether each of the multiple displays is suitable for displaying the conference history information. In some embodiments, the process determines whether all of the conference history information can be displayed on a given display. For example, where the display is a small alphanumeric display on an office phone, the process may determine that the display is not capable of displaying a large amount of conference history information. In some embodiments, the process considers the size (e.g., the number of characters or pixels that can be displayed) of each display. In some embodiments, the process considers the type of the conference history information. For example, whereas a small alphanumeric display on an office phone may be suitable for displaying the name of the speaker, it would not be suitable for displaying an email message sent by the speaker.

FIG. 3.49 is an example flow diagram of example logic illustrating an example embodiment of process 3.100 of FIG. 3.1. More particularly, FIG. 3.49 illustrates a process 3.4900 that includes the process 3.100 and which further includes operations performed by or at the following block(s).

At block 3.4904, the process performs audibly notifying the user to view the conference history information on a display device. In some embodiments, notifying the user may include playing a tone, such as a beep, chime, or other type of notification. In some embodiments, notifying the user may include playing synthesized speech telling the user to view the display device. For example, the process may perform text-to-speech processing to generate audio of a textual message or notification, and this audio may then be played or otherwise output to the user via the conferencing device. In some embodiments, notifying the user may telling the user that a document, calendar event, communication, or the like is available for viewing on the display device. Telling the user about a document or other speaker-related information may include playing synthesized speech that includes an utterance to that effect. In some embodiments, the process may notify the user in a manner that is not audible to at least some of the multiple speakers. For example, a tone or verbal message may be output via an earpiece speaker, such that other parties to the conversation do not hear the notification. As another example, a tone or other notification may be into the earpiece of a telephone, such as when the process is performing its functions within the context of a telephonic conference call.

FIG. 3.50 is an example flow diagram of example logic illustrating an example embodiment of process 3.100 of FIG. 3.1. More particularly, FIG. 3.50 illustrates a process 3.5000 that includes the process 3.100, wherein the presenting at least some of the conference history information includes operations performed by or at the following block(s).

At block 3.5004, the process performs informing the user of an identifier of each of the multiple speakers. In some embodiments, the identifier of each of the speakers may be or include a given name, surname (e.g., last name, family name), nickname, title, job description, or other type of identifier of or associated with the speaker.

FIG. 3.51 is an example flow diagram of example logic illustrating an example embodiment of process 3.100 of FIG. 3.1. More particularly, FIG. 3.51 illustrates a process 3.5100 that includes the process 3.100, wherein the presenting at least some of the conference history information includes operations performed by or at the following block(s).

At block 3.5104, the process performs informing the user of information aside from identifying information related to the multiple speakers. In some embodiments, information aside from identifying information may include information that is not a name or other identifier (e.g., job title) associated with the speaker. For example, the process may tell the user about an event or communication associated with or related to the speaker.

FIG. 3.52 is an example flow diagram of example logic illustrating an example embodiment of process 3.100 of FIG. 3.1. More particularly, FIG. 3.52 illustrates a process 3.5200 that includes the process 3.100, wherein the presenting at least some of the conference history information includes operations performed by or at the following block(s).

At block 3.5204, the process performs informing the user of an identifier of a speaker along with a transcription of a previous utterance made by the speaker. As shown in FIG. 1C, a transcript may include a speaker's name displayed next to an utterance from that speaker.

FIG. 3.53 is an example flow diagram of example logic illustrating an example embodiment of process 3.100 of FIG. 3.1. More particularly, FIG. 3.53 illustrates a process 3.5300 that includes the process 3.100, wherein the presenting at least some of the conference history information includes operations performed by or at the following block(s).

At block 3.5304, the process performs informing the user of an organization to which each of the multiple speakers belongs. In some embodiments, informing the user of an organization may include notifying the user of a business, group, school, club, team, company, or other formal or informal organization with which a speaker is affiliated. Companies may include profit or non-profit entities, regardless of organizational structure (e.g., corporation, partnerships, sole proprietorship).

FIG. 3.54 is an example flow diagram of example logic illustrating an example embodiment of process 3.100 of FIG. 3.1. More particularly, FIG. 3.54 illustrates a process 3.5400 that includes the process 3.100, wherein the presenting at least some of the conference history information includes operations performed by or at the following block(s).

At block 3.5404, the process performs informing the user of a previously transmitted communication referencing one of the multiple speakers. Various forms of communication are contemplated, including textual (e.g., emails, text messages, chats), audio (e.g., voice messages), video, or the like. In some embodiments, a communication can include content in multiple forms, such as text and audio, such as when an email includes a voice attachment.

FIG. 3.55 is an example flow diagram of example logic illustrating an example embodiment of process 3.5400 of FIG. 3.54. More particularly, FIG. 3.55 illustrates a process 3.5500 that includes the process 3.5400, wherein the presenting at least some of the conference history information includes operations performed by or at the following block(s).

At block 3.5504, the process performs informing the user of at least one of: an email transmitted between the one speaker and the user and/or a text message transmitted between the one speaker and the user. An email transmitted between the one speaker and the user may include an email sent from the one speaker to the user, or vice versa. Text messages may include short messages according to various protocols, including SMS, MMS, and the like.

FIG. 3.56 is an example flow diagram of example logic illustrating an example embodiment of process 3.100 of FIG.

3.1. More particularly, FIG. 3.56 illustrates a process 3.5600 that includes the process 3.100, wherein the presenting at least some of the conference history information includes operations performed by or at the following block(s).

At block 3.5604, the process performs informing the user of an event involving the user and one of the multiple speakers. An event may be any occurrence that involves or involved the user and a speaker, such as a meeting (e.g., social or professional meeting or gathering) attended by the user and the speaker, an upcoming deadline (e.g., for a project), or the like.

FIG. 3.57 is an example flow diagram of example logic illustrating an example embodiment of process 3.5600 of FIG. 3.56. More particularly, FIG. 3.57 illustrates a process 3.5700 that includes the process 3.5600, wherein the presenting at least some of the conference history information includes operations performed by or at the following block(s).

At block 3.5704, the process performs informing the user of a previously occurring event and/or a future event that is at least one of a project, a meeting, and/or a deadline.

FIG. 3.58 is an example flow diagram of example logic illustrating an example embodiment of process 3.100 of FIG. 3.1. More particularly, FIG. 3.58 illustrates a process 3.5800 that includes the process 3.100, wherein the determining speaker-related information associated with the multiple speakers includes operations performed by or at the following block(s).

At block 3.5804, the process performs accessing information items associated with one of the multiple speakers. In some embodiments, accessing information items associated with one of the multiple speakers may include retrieving files, documents, data records, or the like from various sources, such as local or remote storage devices, cloud-based servers, and the like. In some embodiments, accessing information items may also or instead include scanning, searching, indexing, or otherwise processing information items to find ones that include, name, mention, or otherwise reference a speaker.

FIG. 3.59 is an example flow diagram of example logic illustrating an example embodiment of process 3.5800 of FIG. 3.58. More particularly, FIG. 3.59 illustrates a process 3.5900 that includes the process 3.5800, wherein the accessing information items associated with one of the multiple speakers includes operations performed by or at the following block(s).

At block 3.5904, the process performs searching for information items that reference the one speaker, the information items including at least one of a document, an email, and/or a text message. In some embodiments, searching may include formulating a search query to provide to a document management system or any other data/document store that provides a search interface. In some embodiments, emails or text messages that reference the one speaker may include messages sent from the one speaker, messages sent to the one speaker, messages that name or otherwise identify the one speaker in the body of the message, or the like.

FIG. 3.60 is an example flow diagram of example logic illustrating an example embodiment of process 3.5800 of FIG. 3.58. More particularly, FIG. 3.60 illustrates a process 3.6000 that includes the process 3.5800, wherein the accessing information items associated with one of the multiple speakers includes operations performed by or at the following block(s).

At block 3.6004, the process performs accessing a social networking service to find messages or status updates that reference the one speaker. In some embodiments, accessing a social networking service may include searching for postings, status updates, personal messages, or the like that have been posted by, posted to, or otherwise reference the one speaker. Example social networking services include Facebook, Twitter, Google Plus, and the like. Access to a social networking service may be obtained via an API or similar interface that provides access to social networking data related to the user and/or the one speaker.

FIG. 3.61 is an example flow diagram of example logic illustrating an example embodiment of process 3.5800 of FIG. 3.58. More particularly, FIG. 3.61 illustrates a process 3.6100 that includes the process 3.5800, wherein the accessing information items associated with one of the multiple speakers includes operations performed by or at the following block(s).

At block 3.6104, the process performs accessing a calendar to find information about appointments with the one speaker. In some embodiments, accessing a calendar may include searching a private or shared calendar to locate a meeting or other appointment with the one speaker, and providing such information to the user via the conferencing device.

FIG. 3.62 is an example flow diagram of example logic illustrating an example embodiment of process 3.5800 of FIG. 3.58. More particularly, FIG. 3.62 illustrates a process 3.6200 that includes the process 3.5800, wherein the accessing information items associated with one of the multiple speakers includes operations performed by or at the following block(s).

At block 3.6204, the process performs accessing a document store to find documents that reference the one speaker. In some embodiments, documents that reference the one speaker include those that are authored at least in part by the one speaker, those that name or otherwise identify the speaker in a document body, or the like. Accessing the document store may include accessing a local or remote storage device/system, accessing a document management system, accessing a source control system, or the like.

FIG. 3.63 is an example flow diagram of example logic illustrating an example embodiment of process 3.100 of FIG. 3.1. More particularly, FIG. 3.63 illustrates a process 3.6300 that includes the process 3.100, wherein the receiving data representing speech signals from a voice conference amongst multiple speakers includes operations performed by or at the following block(s).

At block 3.6304, the process performs receiving audio data from at least one of a telephone, a conference call, an online audio chat, a video conference, and/or a face-to-face conference that includes the multiple speakers, the received audio data representing utterances made by at least one of the multiple speakers. In some embodiments, the process may function in the context of a telephone conference, such as by receiving audio data from a system that facilitates the telephone conference, including a physical or virtual PBX (private branch exchange), a voice over IP conference system, or the like. The process may also or instead function in the context of an online audio chat, a video conference, or a face-to-face conversation.

FIG. 3.64 is an example flow diagram of example logic illustrating an example embodiment of process 3.100 of FIG. 3.1. More particularly, FIG. 3.64 illustrates a process 3.6400 that includes the process 3.100, wherein the receiving data representing speech signals from a voice conference amongst multiple speakers includes operations performed by or at the following block(s).

At block 3.6404, the process performs receiving data representing speech signals from a voice conference amongst multiple speakers, wherein the multiple speakers are remotely located from one another. In some embodiments, the multiple speakers are remotely located from one another. Two speakers may be remotely located from one another even though they are in the same building or at the same site (e.g., campus, cluster of buildings), such as when the speakers are in different rooms, cubicles, or other locations within the site or building. In other cases, two speakers may be remotely located from one another by being in different cities, states, regions, or the like.

FIG. 3.65 is an example flow diagram of example logic illustrating an example embodiment of process 3.100 of FIG. 3.1. More particularly, FIG. 3.65 illustrates a process 3.6500 that includes the process 3.100, wherein the presenting at least some of the conference history information includes operations performed by or at the following block(s).

At block 3.6504, the process performs transmitting the conference history information from a first device to a second device having a display. In some embodiments, at least some of the processing may be performed on distinct devices, resulting in a transmission of conference history information from one device to another device, for example from a desktop computer or a cloud-based server to a conferencing device.

FIG. 3.66 is an example flow diagram of example logic illustrating an example embodiment of process 3.6500 of FIG. 3.65. More particularly, FIG. 3.66 illustrates a process 3.6600 that includes the process 3.6500, wherein the transmitting the conference history information from a first device to a second device includes operations performed by or at the following block(s).

At block 3.6604, the process performs wirelessly transmitting the conference history information. Various protocols may be used, including Bluetooth, infrared, WiFi, or the like.

FIG. 3.67 is an example flow diagram of example logic illustrating an example embodiment of process 3.6500 of FIG. 3.65. More particularly, FIG. 3.67 illustrates a process 3.6700 that includes the process 3.6500, wherein the transmitting the conference history information from a first device to a second device includes operations performed by or at the following block(s).

At block 3.6704, the process performs transmitting the conference history information from a smart phone to the second device. For example a smart phone may forward the conference history information to a desktop computing system for display on an associated monitor.

FIG. 3.68 is an example flow diagram of example logic illustrating an example embodiment of process 3.6500 of FIG. 3.65. More particularly, FIG. 3.68 illustrates a process 3.6800 that includes the process 3.6500, wherein the transmitting the conference history information from a first device to a second device includes operations performed by or at the following block(s).

At block 3.6804, the process performs transmitting the conference history information from a server system to the second device. In some embodiments, some portion of the processing is performed on a server system that may be remote from the conferencing device.

FIG. 3.69 is an example flow diagram of example logic illustrating an example embodiment of process 3.6800 of FIG. 3.68. More particularly, FIG. 3.69 illustrates a process 3.6900 that includes the process 3.6800, wherein the transmitting the conference history information from a server system includes operations performed by or at the following block(s).

At block 3.6904, the process performs transmitting the conference history information from a server system that resides in a data center.

FIG. 3.70 is an example flow diagram of example logic illustrating an example embodiment of process 3.6800 of FIG. 3.68. More particularly, FIG. 3.70 illustrates a process 3.7000 that includes the process 3.6800, wherein the transmitting the conference history information from a server system includes operations performed by or at the following block(s).

At block 3.7004, the process performs transmitting the conference history information from a server system to a desktop computer, a laptop computer, a mobile device, or a desktop telephone of the user.

FIG. 3.71 is an example flow diagram of example logic illustrating an example embodiment of process 3.100 of FIG. 3.1. More particularly, FIG. 3.71 illustrates a process 3.7100 that includes the process 3.100 and which further includes operations performed by or at the following block(s).

At block 3.7104, the process performs performing the receiving data representing speech signals from a voice conference amongst multiple speakers, the determining speaker-related information associated with the multiple speakers, the recording conference history information based on the speaker-related information, and/or the presenting at least some of the conference history information on a mobile device that is operated by the user. As noted, in some embodiments a computer or mobile device such as a smart phone may have sufficient processing power to perform a portion of the process, such as identifying a speaker, determining the conference history information, or the like.

FIG. 3.72 is an example flow diagram of example logic illustrating an example embodiment of process 3.7100 of FIG. 3.71. More particularly, FIG. 3.72 illustrates a process 3.7200 that includes the process 3.7100, wherein the determining speaker-related information associated with the multiple speakers includes operations performed by or at the following block(s).

At block 3.7204, the process performs determining speaker-related information associated with the multiple speakers, performed on a smart phone or a media player that is operated by the user.

FIG. 3.73 is an example flow diagram of example logic illustrating an example embodiment of process 3.100 of FIG. 3.1. More particularly, FIG. 3.73 illustrates a process 3.7300 that includes the process 3.100 and which further includes operations performed by or at the following block(s).

At block 3.7304, the process performs performing the receiving data representing speech signals from a voice conference amongst multiple speakers, the determining speaker-related information associated with the multiple speakers, the recording conference history information based on the speaker-related information, and/or the presenting at least some of the conference history information on a general purpose computing device that is operated by the user. For example, in an office setting, a general purpose computing device (e.g., the user's desktop computer, laptop computer) may be configured to perform some or all of the process.

FIG. 3.74 is an example flow diagram of example logic illustrating an example embodiment of process 3.100 of FIG. 3.1. More particularly, FIG. 3.74 illustrates a process 3.7400 that includes the process 3.100 and which further includes operations performed by or at the following block(s).

At block 3.7404, the process performs performing one or more of the receiving data representing speech signals from a voice conference amongst multiple speakers, the determining speaker-related information associated with the multiple speakers, the recording conference history information based on the speaker-related information, and/or the presenting at least some of the conference history information on each of multiple computing systems, wherein each of the multiple systems is associated with one of the multiple speakers. In some embodiments, each of the multiple speakers has his own computing system that performs one or more operations of the method.

FIG. 3.75 is an example flow diagram of example logic illustrating an example embodiment of process 3.100 of FIG. 3.1. More particularly, FIG. 3.75 illustrates a process 3.7500 that includes the process 3.100 and which further includes operations performed by or at the following block(s).

At block 3.7504, the process performs performing one or more of the receiving data representing speech signals from a voice conference amongst multiple speakers, the determining speaker-related information associated with the multiple speakers, the recording conference history information based on the speaker-related information, and/or the presenting at least some of the conference history information within a conference call provider system. In some embodiments, a conference call provider system performs one or more of the operations of the method. For example, a Internet-based conference call system may receive audio data from participants in a voice conference, and perform various processing tasks, including speech recognition, recording conference history information, and the like.

FIG. 3.76 is an example flow diagram of example logic illustrating an example embodiment of process 3.100 of FIG. 3.1. More particularly, FIG. 3.76 illustrates a process 3.7600 that includes the process 3.100 and which further includes operations performed by or at the following block(s).

At block 3.7604, the process performs determining to perform at least some of the receiving data representing speech signals from a voice conference amongst multiple speakers, the determining speaker-related information associated with the multiple speakers, the recording conference history information based on the speaker-related information, and/or the presenting at least some of the conference history information on another computing device that has available processing capacity. In some embodiments, the process may determine to offload some of its processing to another computing device or system.

FIG. 3.77 is an example flow diagram of example logic illustrating an example embodiment of process 3.7600 of FIG. 3.76. More particularly, FIG. 3.77 illustrates a process 3.7700 that includes the process 3.7600 and which further includes operations performed by or at the following block(s).

At block 3.7704, the process performs receiving at least some of speaker-related information or the conference history information from the another computing device. The process may receive the speaker-related information or the conference history information or a portion thereof from the other computing device.

FIG. 3.78 is an example flow diagram of example logic illustrating an example embodiment of process 3.100 of FIG. 3.1. More particularly, FIG. 3.78 illustrates a process 3.7800 that includes the process 3.100 and which further includes operations performed by or at the following block(s).

At block 3.7804, the process performs selecting a portion of the conference history information based on capabilities of a device operated by the user. In some embodiments, the process selects a portion of the recorded conference history information based on device capabilities, such as processing power, memory, display capabilities, or the like.

At block 3.7805, the process performs transmitting the selected portion for presentation on the device operated by the user. The process may then transmit just the selected portion to the device. For example, if a user is using a mobile phone having limited memory, the process may elect not to transmit previously recorded audio to the mobile phone and instead only transmit the text transcription of the voice conference. As another example, if the mobile phone has a limited display, the process may only send information items that can be readily presented on the display.

FIG. 3.79 is an example flow diagram of example logic illustrating an example embodiment of process 3.100 of FIG. 3.1. More particularly, FIG. 3.79 illustrates a process 3.7900 that includes the process 3.100 and which further includes operations performed by or at the following block(s).

At block 3.7904, the process performs performing speech recognition to convert an utterance of one of the multiple speakers into text, the speech recognition performed at a mobile device of the one speaker. In some embodiments, a mobile device (e.g., a cell phone, smart phone) of a speaker may perform speech recognition on the speaker's utterances. As discussed below, the results of the speech recognition may then be transmitted to some remote system or device.

At block 3.7905, the process performs transmitting the text along with an audio representation of the utterance and an identifier of the speaker to a remote conferencing device and/or a conference call system. After having performed the speech recognition, the mobile device may transmit the obtained text along with an identifier of the speaker and the audio representation of the speaker's utterance to a remote system or device. In this manner, the speech recognition load may be distributed among multiple distributed communication devices used by the speakers in the voice conference.

FIG. 3.80 is an example flow diagram of example logic illustrating an example embodiment of process 3.100 of FIG. 3.1. More particularly, FIG. 3.80 illustrates a process 3.8000 that includes the process 3.100 and which further includes operations performed by or at the following block(s).

At block 3.8004, the process performs translating an utterance of one of the multiple speakers in a first language into a message in a second language, based on the speaker-related information. In some embodiments, the process may also perform language translation, such that a voice conference may be held between speakers of different languages. In some embodiments, the utterance may be translated by first performing speech recognition on the data representing the speech signal to convert the utterance into textual form. Then, the text of the utterance may be translated into the second language using a natural language processing and/or machine translation techniques. The speaker-related information may be used to improve, enhance, or otherwise modify the process of machine translation. For example, based on the identity of the one speaker, the process may use a language or speech model that is tailored to the one speaker in order to improve a machine translation process. As another example, the process may use one or more information items that reference the one speaker to improve machine translation, such as by disambiguating references in the utterance of the one speaker.

At block 3.8006, the process performs recording the message in the second language as part of the conference history information. The message may be recorded as part of the conference history information for later presentation. The conference history information may of course be presented in various ways including using audible output (e.g., via text-to-speech processing of the message) and/or using visible output of the message (e.g., via a display screen of the conferencing device or some other device that is accessible to the user).

FIG. 3.81 is an example flow diagram of example logic illustrating an example embodiment of process 3.8000 of FIG. 3.80. More particularly, FIG. 3.81 illustrates a process

3.8100 that includes the process 3.8000 and which further includes operations performed by or at the following block(s).

At block 3.8104, the process performs determining the first language. In some embodiments, the process may determine or identify the first language, possibly prior to performing language translation. For example, the process may determine that the one speaker is speaking in German, so that it can configure a speech recognizer to recognize German language utterances. In some embodiments, determining the first language may include concurrently processing the received data with multiple speech recognizers that are each configured to recognize speech in a different corresponding language (e.g., German, French, Spanish). Then, the process may select as the first language the language corresponding to a speech recognizer of the multiple speech recognizers that produces a result that has a higher confidence level than other of the multiple speech recognizers. In some embodiments, determining the language may be based on one or more of signal characteristics that are correlated with the first language, the location of the user or the speaker, user inputs, or the like.

FIG. 3.82 is an example flow diagram of example logic illustrating an example embodiment of process 3.8000 of FIG. 3.80. More particularly, FIG. 3.82 illustrates a process 3.8200 that includes the process 3.8000, wherein the translating an utterance of one of the multiple speakers in a first language into a message in a second language includes operations performed by or at the following block(s).

At block 3.8204, the process performs performing speech recognition, based on the speaker-related information, on the data representing the speech signal to convert the utterance in the first language into text representing the utterance in the first language. The speech recognition process may be improved, augmented, or otherwise adapted based on the speaker-related information. In one example, information about vocabulary frequently used by the one speaker may be used to improve the performance of a speech recognizer.

At block 3.8206, the process performs translating, based on the speaker-related information, the text representing the utterance in the first language into text representing the message in the second language. Translating from a first to a second language may also be improved, augmented, or otherwise adapted based on the speaker-related information. For example, when such a translation includes natural language processing to determine syntactic or semantic information about an utterance, such natural language processing may be improved with information about the one speaker, such as idioms, expressions, or other language constructs frequently employed or otherwise correlated with the one speaker.

FIG. 3.83 is an example flow diagram of example logic illustrating an example embodiment of process 3.8200 of FIG. 3.82. More particularly, FIG. 3.83 illustrates a process 3.8300 that includes the process 3.8200 and which further includes operations performed by or at the following block(s).

At block 3.8304, the process performs performing speech synthesis to convert the text representing the utterance in the second language into audio data representing the message in the second language.

At block 3.8305, the process performs causing the audio data representing the message in the second language to be played to the user. The message may be played, for example, via an audio speaker of the conferencing device.

FIG. 3.84 is an example flow diagram of example logic illustrating an example embodiment of process 3.8000 of FIG. 3.80. More particularly, FIG. 3.84 illustrates a process 3.8400 that includes the process 3.8000, wherein the translating an utterance of one of the multiple speakers in a first language into a message in a second language includes operations performed by or at the following block(s).

At block 3.8404, the process performs translating the utterance based on speaker-related information including a language model that is adapted to the one speaker. A speaker-adapted language model may include or otherwise identify frequent words or patterns of words (e.g., n-grams) based on prior communications or other information about the one speaker. Such a language model may be based on communications or other information generated by or about the one speaker. Such a language model may be employed in the course of speech recognition, natural language processing, machine translation, or the like. Note that the language model need not be unique to the one speaker, but may instead be specific to a class, type, or group of speakers that includes the one speaker. For example, the language model may be tailored for speakers in a particular industry, from a particular region, or the like.

FIG. 3.85 is an example flow diagram of example logic illustrating an example embodiment of process 3.8000 of FIG. 3.80. More particularly, FIG. 3.85 illustrates a process 3.8500 that includes the process 3.8000, wherein the translating an utterance of one of the multiple speakers in a first language into a message in a second language includes operations performed by or at the following block(s).

At block 3.8504, the process performs translating the utterance based on speaker-related information including a language model adapted to the voice conference. A language model adapted to the voice conference may include or otherwise identify frequent words or patterns of words (e.g., n-grams) based on prior communications or other information about any one or more of the speakers in the voice conference. Such a language model may be based on communications or other information generated by or about the speakers in the voice conference. Such a language model may be employed in the course of speech recognition, natural language processing, machine translation, or the like.

FIG. 3.86 is an example flow diagram of example logic illustrating an example embodiment of process 3.8500 of FIG. 3.85. More particularly, FIG. 3.86 illustrates a process 3.8600 that includes the process 3.8500, wherein the translating the utterance based on speaker-related information including a language model adapted to the voice conference includes operations performed by or at the following block(s).

At block 3.8604, the process performs generating the language model based on information items by or about any of the multiple speakers, the information items including at least one of emails, documents, and/or social network messages. In some embodiments, the process mines or otherwise processes emails, text messages, voice messages, social network messages, and the like to generate a language model that is tailored to the voice conference.

FIG. 3.87 is an example flow diagram of example logic illustrating an example embodiment of process 3.8000 of FIG. 3.80. More particularly, FIG. 3.87 illustrates a process 3.8700 that includes the process 3.8000, wherein the translating an utterance of one of the multiple speakers in a first language into a message in a second language includes operations performed by or at the following block(s).

At block 3.8704, the process performs translating the utterance based on speaker-related information including a language model developed with respect to a corpus of related content. In some embodiments, the process may use language models developed with respect to a corpus of related content, such as may be obtained from past voice conferences, academic conferences, documentaries, or the like. For example, if the current voice conference is about a particular technical subject, the process may refer to a language model from a prior academic conference directed to the same technical subject. Such a language model may be based on an analysis of academic papers and/or transcriptions from the academic conference.

FIG. 3.88 is an example flow diagram of example logic illustrating an example embodiment of process 3.8700 of FIG. 3.87. More particularly, FIG. 3.88 illustrates a process 3.8800 that includes the process 3.8700, wherein the corpus of related content is obtained from at least one of a voice conference, an academic conference, a media program, an academic journal, and/or a Web site. For example, the process generate a language model based on papers presented at an academic conference, information presented as part of a documentary or other program, the content of an academic journal, content of a Web site or page that is devoted or directed to particular subject matter (e.g., a Wikipedia page), or the like.

FIG. 3.89 is an example flow diagram of example logic illustrating an example embodiment of process 3.100 of FIG. 3.1. More particularly, FIG. 3.89 illustrates a process 3.8900 that includes the process 3.100, wherein the receiving data representing speech signals from a voice conference amongst multiple speakers includes operations performed by or at the following block(s).

At block 3.8904, the process performs receiving digital samples of an audio wave captured by a microphone. In some embodiments, the microphone may be a microphone of a conferencing device operated by a speaker. The samples may be raw audio samples or in some compressed format.

FIG. 3.90 is an example flow diagram of example logic illustrating an example embodiment of process 3.100 of FIG. 3.1. More particularly, FIG. 3.90 illustrates a process 3.9000 that includes the process 3.100, wherein the receiving data representing speech signals from a voice conference amongst multiple speakers includes operations performed by or at the following block(s).

At block 3.9004, the process performs receiving a recorded voice samples from a storage device. In some embodiments, the process receives audio data from a storage device, such as a magnetic disk, a memory, or the like. The audio data may be stored or buffered on the storage device.

FIG. 3.91 is an example flow diagram of example logic illustrating an example embodiment of process 3.100 of FIG. 3.1. More particularly, FIG. 3.91 illustrates a process 3.9100 that includes the process 3.100, wherein the user is one of the multiple speakers. In some embodiments, the user may be a participant in the voice conference, in that the user is also one of the multiple speakers.

FIG. 3.92 is an example flow diagram of example logic illustrating an example embodiment of process 3.100 of FIG. 3.1. More particularly, FIG. 3.92 illustrates a process 3.9200 that includes the process 3.100, wherein the user is not one of the multiple speakers. In some embodiments, the user may not be one of the speakers, such as because the user is observing the voice conference, or because the user is viewing a recording of a previously captured voice conference.

FIG. 3.93 is an example flow diagram of example logic illustrating an example embodiment of process 3.100 of FIG. 3.1. More particularly, FIG. 3.93 illustrates a process 3.9300 that includes the process 3.100, wherein the speaker is not a human. In some embodiments, the speaker may not be a human, but rather an automated device or system, such as a screen reader, an artificial intelligence system, a voice browser, or the like.

FIG. 3.94 is an example flow diagram of example logic illustrating an example embodiment of process 3.100 of FIG. 3.1. More particularly, FIG. 3.94 illustrates a process 3.9400 that includes the process 3.100 and which further includes operations performed by or at the following block(s).

At block 3.9404, the process performs determining to perform one or more of archiving, indexing, searching, removing, redacting, duplicating, or deleting some of the conference history information based on a data retention policy. In some embodiments, the process may determine to perform various operations in accordance with a data retention policy. For example, an organization may elect to record conference history information for all conference calls for a specified time period. In such cases, the process may be configured to automatically delete conference history information after a specified time interval (e.g., one year, six months). As another example, the process may redact the names or other identifiers of speakers in the conference history information associated with a conference call.

3. Example Computing System Implementation

Figure 4:
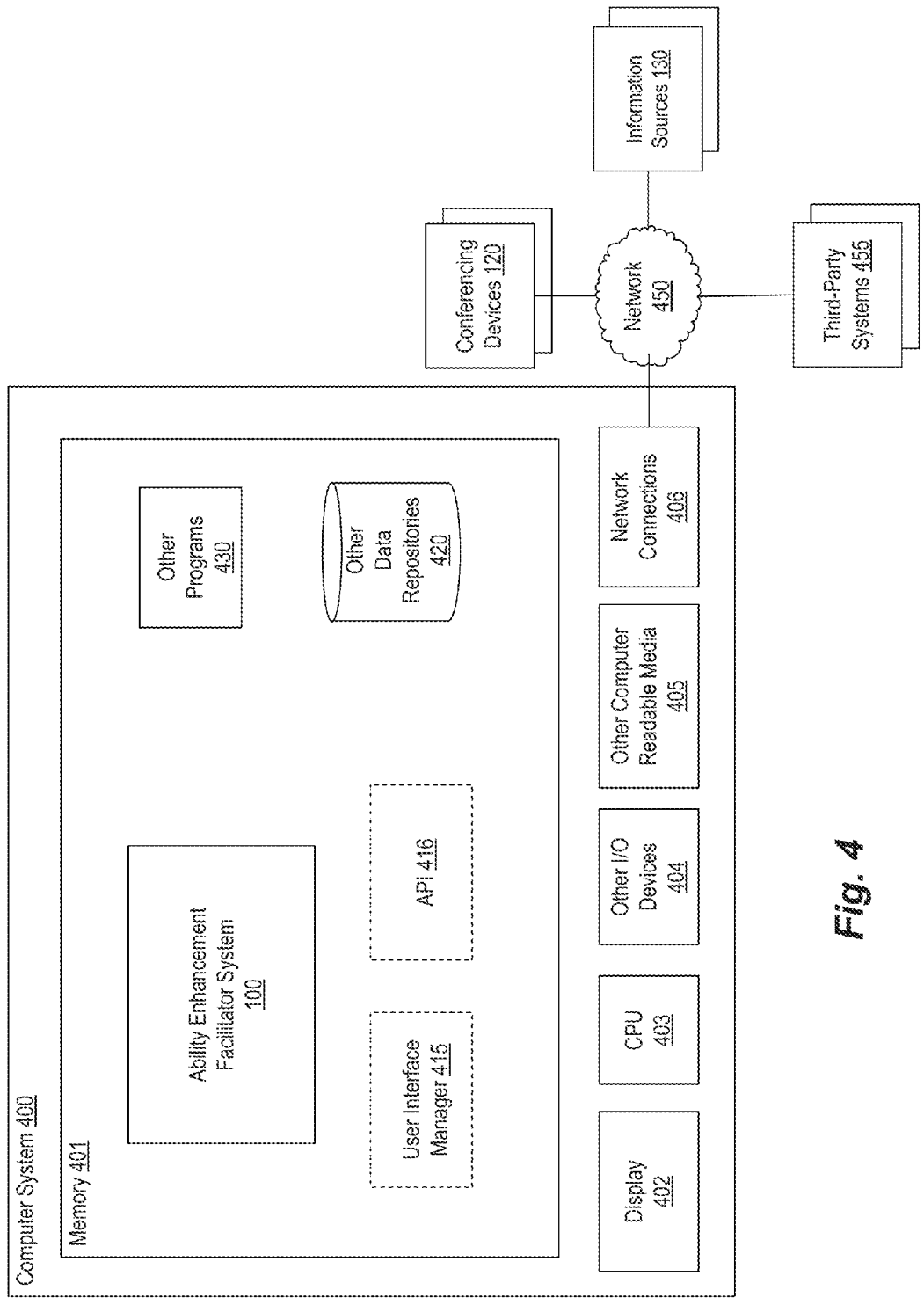
FIG. 4 is an example block diagram of an example computing system for implementing an ability enhancement facilitator system according to an example embodiment.

FIG. 4 is an example block diagram of an example computing system for implementing an ability enhancement facilitator system according to an example embodiment. In particular, FIG. 4 shows a computing system 400 that may be utilized to implement an AEFS 100.

Note that one or more general purpose or special purpose computing systems/devices may be used to implement the AEFS 100. In addition, the computing system 400 may comprise one or more distinct computing systems/devices and may span distributed locations. Furthermore, each block shown may represent one or more such blocks as appropriate to a specific embodiment or may be combined with other blocks. Also, the AEFS 100 may be implemented in software, hardware, firmware, or in some combination to achieve the capabilities described herein.

In the embodiment shown, computing system 400 comprises a computer memory ("memory") 401, a display 402, one or more Central Processing Units ("CPU") 403, Input/Output devices 404 (e.g., keyboard, mouse, CRT or LCD display, and the like), other computer-readable media 405, and network connections 406. The AEFS 100 is shown residing in memory 401. In other embodiments, some portion of the contents, some or all of the components of the AEFS 100 may be stored on and/or transmitted over the other computer-readable media 405. The components of the AEFS 100 preferably execute on one or more CPUs 403 and facilitate ability enhancement, as described herein. Other code or programs 430 (e.g., an administrative interface, a Web server, and the like) and potentially other data repositories, such as data repository 420, also reside in the memory 401, and preferably execute on one or more CPUs 403. Of note, one or more of the components in FIG. 4 may not be present in any specific implementation. For example, some embodiments may not provide other computer readable media 405 or a display 402.

The AEFS 100 interacts via the network 450 with conferencing devices 120, speaker-related information sources 130, and third-party systems/applications 455. The network 450 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The third-party systems/applications 455 may include any systems that provide data to, or utilize data from, the AEFS 100, including Web browsers, e-commerce sites, calendar applications, email systems, social networking services, and the like.

The AEFS 100 is shown executing in the memory 401 of the computing system 400. Also included in the memory are a user interface manager 415 and an application program interface ("API") 416. The user interface manager 415 and the API 416 are drawn in dashed lines to indicate that in other embodiments, functions performed by one or more of these components may be performed externally to the AEFS 100.

The UI manager 415 provides a view and a controller that facilitate user interaction with the AEFS 100 and its various components. For example, the UI manager 415 may provide interactive access to the AEFS 100, such that users can configure the operation of the AEFS 100, such as by providing the AEFS 100 credentials to access various sources of speaker-related information, including social networking services, email systems, document stores, or the like. In some embodiments, access to the functionality of the UI manager 415 may be provided via a Web server, possibly executing as one of the other programs 430. In such embodiments, a user operating a Web browser executing on one of the third-party systems 455 can interact with the AEFS 100 via the UI manager 415.

The API 416 provides programmatic access to one or more functions of the AEFS 100. For example, the API 416 may provide a programmatic interface to one or more functions of the AEFS 100 that may be invoked by one of the other programs 430 or some other module. In this manner, the API 416 facilitates the development of third-party software, such as user interfaces, plug-ins, adapters (e.g., for integrating functions of the AEFS 100 into Web applications), and the like.

In addition, the API 416 may be in at least some embodiments invoked or otherwise accessed via remote entities, such as code executing on one of the conferencing devices 120, information sources 130, and/or one of the third-party systems/applications 455, to access various functions of the AEFS 100. For example, an information source 130 may push speaker-related information (e.g., emails, documents, calendar events) to the AEFS 100 via the API 416. The API 416 may also be configured to provide management widgets (e.g., code modules) that can be integrated into the third-party applications 455 and that are configured to interact with the AEFS 100 to make at least some of the described functionality available within the context of other applications (e.g., mobile apps).

In an example embodiment, components/modules of the AEFS 100 are implemented using standard programming techniques. For example, the AEFS 100 may be implemented as a "native" executable running on the CPU 403, along with one or more static or dynamic libraries. In other embodiments, the AEFS 100 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the AEFS 100, such as in the data store 420 (or 240), can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 420 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the AEFS 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

From the foregoing it will be appreciated that, although specific embodiments have been described herein for purposes of illustration, various modifications may be made without deviating from the spirit and scope of this disclosure. For example, the methods, techniques, and systems for ability enhancement are applicable to other architectures or in other settings. For example, instead of providing assistance to users who are engaged in a voice conference, at least some of the techniques may be employed to transcribe and/or analyze media items, events, or presentations, including newscasts, films, programs, or other media items distributed via television, radio, the Internet, or similar mechanisms. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method for ability enhancement, the method comprising: by a computer system,
receiving data representing speech signals from a voice conference amongst multiple speakers, wherein the multiple speakers are remotely located from one another, wherein each of the multiple speakers uses a separate conferencing device to participate in the voice conference;
determining speaker-related information associated with the multiple speakers, based on the data representing speech signals from the voice conference;
recording conference history information based on the speaker-related information, by recording indications of topics discussed during the voice conference by:
performing speech recognition to convert the data representing speech signals into text;
analyzing the text to identify frequently used terms or phrases; and
determining the topics discussed during the voice conference based on the frequently used terms or phrases;
audibly notifying a user to view the conference history information on a display device, wherein the user is notified in a manner that is not audible to at least some of the multiple speakers; and
presenting, on the display device, at least some of the conference history information to the user;
translating an utterance of one of the multiple speakers in a first language into a message in a second language, based on the speaker-related information,
wherein the speaker related information is determined by automatically determining the second and the first language comprising steps of:
concurrently or simultaneously applying multiple speech recognizers and using GPS information indicating the speakers' locations; and
recording the message in the second language as part of the conference history information.

2. The method of claim 1, wherein the recording conference history information based on the speaker-related information includes: recording a transcription of utterances made by speakers during the voice conference.

3. The method of claim 2, wherein the recording a transcription includes:
performing speech recognition to convert data representing a speech signal from one of the multiple speakers into text; and
storing the text in association with an indicator of the one speaker.

4. The method of claim 1, further comprising: performing voice identification based on the data representing the speech signals from the voice conference.

5. The method of claim 4, wherein the performing voice identification includes: in a conference call system, matching a portion of the data representing the speech signals with an identity of one of the multiple speakers, based on a communication channel that is associated with the one speaker and over which the portion of the data is transmitted.

6. The method of claim 4, the semantic content including a name, event, or entity mentioned by a speaker.

7. The method of claim 6, further comprising:
processing voice messages from the multiple persons to generate voice print data for each of the multiple persons, wherein each of the voice messages is a telephone voice mail message stored by a voice mail service in association with a sender telephone number; and
performing reverse directory lookups using the sender telephone numbers to determine names of speakers associated with the voice messages.

8. The method of claim 1, wherein the recording conference history information based on the speaker-related information includes: recording indications of information items related to subject matter of the voice conference.

9. The method of claim 8, wherein the recording indications of information items related to subject matter of the voice conference includes:
performing speech recognition to convert the data representing speech signals into text; and
analyzing the text to identify information items mentioned by the speakers.

10. The method of claim 1, wherein the presenting at least some of the conference history information includes: presenting the conference history information to a participant in the voice conference, the participant having rejoined the voice conference after having not participated in the voice conference for a period of time.

11. The method of claim 10, wherein the participant rejoins the voice conference after at least one of: pausing the voice conference, muting the voice conference, holding the voice conference, voluntarily leaving the voice conference, and/or involuntarily leaving the voice conference.

12. The method of claim 1, wherein the recording conference history information based on the speaker-related information includes: recording the data representing speech signals from the voice conference.

13. The method of claim 1, wherein the recording conference history information based on the speaker-related information includes: as each of the multiple speakers takes a turn speaking during the voice conference, recording speaker-related information associated with the speaker.

14. The method of claim 1, wherein the recording conference history information based on the speaker-related information includes: recording conference history information based on the speaker-related information during a telephone conference call amongst the multiple speakers.

15. The method of claim 1, wherein the presenting at least some of the conference history information includes: presenting the conference history information to a new participant in the voice conference, the new participant having joined the voice conference while the voice conference was already in progress.

16. The method of claim 1, wherein the presenting at least some of the conference history information includes: presenting the conference history information to a user after conclusion of the voice conference.

17. The method of claim 1, wherein the presenting at least some of the conference history information includes: providing a user interface configured to access the conference history information by scrolling through a temporal record of the voice conference.

18. The method of claim 1, wherein the presenting at least some of the conference history information includes: presenting a transcription of utterances made by speakers during the voice conference.

19. The method of claim 1, wherein the presenting at least some of the conference history information includes: presenting indications of topics discussed during the voice conference.

20. The method of claim 1, wherein the presenting at least some of the conference history information includes: presenting indications of information items related to subject matter of the voice conference.

21. The method of claim 1, wherein the presenting at least some of the conference history information includes: presenting, while a current speaker is speaking, conference history information on a display device of the user, the displayed conference history information providing information related to previous statements made by the current speaker.

22. The method of claim 1, further comprising:
retrieving information items that reference the text data; and
informing the user of the retrieved information items.

23. The method of claim 1, wherein the performing speech recognition includes:
performing speech recognition based at least in part on a language model associated with the one speaker, wherein the language model represents word transition likelihoods; and
generating the language model based on information items generated by or referencing any of the multiple speakers, the information items including emails, documents, and/or social network messages.

24. The method of claim 1, wherein the determining speaker-related information associated with the multiple speakers includes: determining which one of the multiple speakers is speaking during a time interval.

25. The method of claim 1, wherein the determining speaker-related information associated with the multiple speakers includes:
developing a corpus of speaker data by recording speech from multiple persons;
generating a speech model associated with each of the multiple persons, based on the recorded speech;
determining the speaker-related information based at least in part on the corpus of speaker data;
receiving feedback regarding accuracy of the conference history information; and
training a speech processor based at least in part on the received feedback.

26. The method of claim 1, wherein the presenting at least some of the conference history information includes: presenting the conference history information on a display of a conferencing device of the user.

27. The method of claim 1, wherein audibly notifying the user to view the conference history information on a display device includes: playing, via an earpiece speaker of the user, synthesized speech telling the user that a document is available for viewing on the display device, such that other parties to the conference do not hear the notification.

28. The method of claim 1, wherein the presenting at least some of the conference history information includes all of: informing the user of an identifier of each of the multiple speakers; informing the user of an identifier of a speaker along with a transcription of a previous utterance made by the speaker; informing the user of an organization to which each of the multiple speakers belongs; informing the user of a previously transmitted communication referencing one of the multiple speakers; and informing the user of an event involving the user and one of the multiple speakers.

29. The method of claim 1, wherein the determining speaker-related information associated with the multiple speakers includes: accessing information items associated with one of the multiple speakers, the accessing including all of: searching for information items that reference the one speaker, the information items including at least one of a document, an email, and/or a text message; accessing a social networking service to find messages or status updates that reference the one speaker; accessing a calendar to find information about appointments with the one speaker; and accessing a document store to find documents that reference the one speaker.

30. The method of claim 1, wherein the receiving data representing speech signals from a voice conference amongst multiple speakers includes: receiving audio data from at least one of a telephone, a conference call, an online audio chat, a video conference, and/or a face-to-face conference that includes the multiple speakers, the received audio data representing utterances made by at least one of the multiple speakers.

31. The method of claim 1, wherein the presenting at least some of the conference history information includes: transmitting the conference history information from a first device to a second device having a display.

32. The method of claim 1, further comprising: performing the receiving data representing speech signals from a voice conference amongst multiple speakers, the determining speaker-related information associated with the multiple speakers, the recording conference history information based on the speaker-related information, and/or the presenting at least some of the conference history information on a mobile device that is operated by the user.

33. The method of claim 1, further comprising: performing the receiving data representing speech signals from a voice conference amongst multiple speakers, the determining speaker-related information associated with the multiple speakers, the recording conference history information based on the speaker-related information, and/or the presenting at least some of the conference history information on a general purpose computing device that is operated by the user.

34. The method of claim 1, further comprising: performing one or more of the receiving data representing speech signals from a voice conference amongst multiple speakers, the determining speaker-related information associated with the multiple speakers, the recording conference history information based on the speaker-related information, and/or the presenting at least some of the conference history information on each of multiple computing systems, wherein each of the multiple systems is associated with one of the multiple speakers.

35. The method of claim 1, further comprising: performing one or more of the receiving data representing speech signals from a voice conference amongst multiple speakers, the determining speaker-related information associated with the multiple speakers, the recording conference history information based on the speaker-related information, and/or the presenting at least some of the conference history information within a conference call provider system.

36. The method of claim 1, further comprising: determining to perform at least some of the receiving data representing speech signals from a voice conference amongst multiple speakers, the determining speaker-related information associated with the multiple speakers, the recording conference history information based on the speaker-related information, and/or the presenting at least some of the conference history information on another computing device that has available processing capacity.

37. The method of claim 1, further comprising:
selecting a portion of the conference history information based on capabilities of a device operated by the user; and
transmitting the selected portion for presentation on the device operated by the user.

38. The method of claim 1, further comprising:
performing speech recognition to convert an utterance of one of the multiple speakers into text, the speech recognition performed at a mobile device of the one speaker; and
transmitting the text along with an audio representation of the utterance and an identifier of the speaker to a remote conferencing device and/or a conference call system.

39. The method of claim 1, wherein the user is not one of the multiple speakers.

40. The method of claim 1, wherein the speaker is not a human.

41. The method of claim 1, further comprising: determining to perform one or more of archiving, indexing, searching, removing, redacting, duplicating, or deleting some of the conference history information based on a data retention policy.

42. A non-transitory computer-readable medium having contents that are configured, when executed, to cause a computing system to perform a method for ability enhancement, the method comprising: by the computer system,
receiving data representing speech signals from a voice conference amongst multiple speakers, wherein the multiple speakers are remotely located from one another, wherein each of the multiple speakers uses a separate conferencing device to participate in the voice conference;
determining speaker-related information associated with the multiple speakers, based on the data representing speech signals from the voice conference;
recording conference history information based on the speaker-related information, by recording indications of topics discussed during the voice conference by:
performing speech recognition to convert the data representing speech signals into text;
analyzing the text to identify frequently used terms or phrases; and
determining the topics discussed during the voice conference based on the frequently used terms or phrases;
audibly notifying a user to view the conference history information on a display device,
wherein the user is notified in a manner that is not audible to at least some of the multiple speakers; and
presenting, on the display device, at least some of the conference history information to the user;
translating an utterance of one of the multiple speakers in a first language into a message in a second language, based on the speaker-related information,
wherein the speaker related information is determined by automatically determining the second and the first language comprising steps of:
concurrently or simultaneously applying multiple speech recognizers and using GPS information indicating the speakers' locations; and
recording the message in the second language as part of the conference history information.

43. A computing system for ability enhancement, the computing system comprising:
a processor;
a memory; and
a module that is stored in the memory and that is configured, when executed by the processor, to perform a method comprising: by the computer system,
receiving data representing speech signals from a voice conference amongst multiple speakers, wherein the multiple speakers are remotely located from one another, wherein each of the multiple speakers uses a separate conferencing device to participate in the voice conference;
determining speaker-related information associated with the multiple speakers, based on the data representing speech signals from the voice conference;
recording conference history information based on the speaker-related information, by recording indications of topics discussed during the voice conference by:
performing speech recognition to convert the data representing speech signals into text;
analyzing the text to identify frequently used terms or phrases; and determining the topics discussed during the voice conference based on the frequently used terms or phrases;
audibly notifying a user to view the conference history information on a display device, wherein the user is notified in a manner that is not audible to at least some of the multiple speakers; and
presenting, on the display device, at least some of the conference history information to the user;
translating an utterance of one of the multiple speakers in a first language into a message in a second language, based on the speaker-related information,
wherein the speaker related information is determined by automatically determining the second and the first language comprising steps of:
concurrently or simultaneously applying multiple speech recognizers and using GPS information indicating the speakers' locations; and
recording the message in the second language as part of the conference history information.

* * * * *